United States Patent
Kurihara et al.

(10) Patent No.: US 7,018,546 B2
(45) Date of Patent: Mar. 28, 2006

(54) WATER TREATMENT METHOD AND WATER TREATMENT DEVICE

(75) Inventors: Masahiro Kurihara, Yokohama (JP); Kazuo Takei, Tokyo (JP); Kunio Hashiba, Tokyo (JP); Kageyoshi Katakura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 36 days.

(21) Appl. No.: 10/754,319

(22) Filed: Jan. 8, 2004

(65) Prior Publication Data

US 2004/0173541 A1     Sep. 9, 2004

(30) Foreign Application Priority Data

Mar. 6, 2003  (JP) .............................. 2003-059307
Mar. 14, 2003 (JP) .............................. 2003-069051
Mar. 20, 2003 (JP) .............................. 2003-078241

(51) Int. Cl.
    *C02F 1/36* (2006.01)

(52) U.S. Cl. ................ 210/748; 422/20; 204/157.15

(58) Field of Classification Search ................ 210/748, 210/764; 422/20, 128; 204/157.15, 157.42; 73/570, 587; 261/DIG. 48
    See application file for complete search history.

(56) References Cited

U.S. PATENT DOCUMENTS 4,086,057 A * 4/1978 Everett ...................... 422/128
4,556,467 A * 12/1985 Kuhn et al. ................. 204/193
5,198,122 A * 3/1993 Koszalka et al. ........... 210/748
6,224,826 B1 * 5/2001 Katakura et al. ............. 422/20
6,719,449 B1 * 4/2004 Laugharn et al. ........... 366/127
6,863,826 B1 * 3/2005 Sheets ........................ 210/705

FOREIGN PATENT DOCUMENTS

| JP | 06-71226 | 3/1994 |
| JP | 07-265794 | 10/1995 |
| JP | 2001-009448 | 1/2001 |
| JP | 2001-334264 | 12/2001 |

OTHER PUBLICATIONS

Tsunenori Okada, et. al., "Cavitation Erosion", *Science of Machine*, vol. 49, No. 9 (Sep. 1997) to vol. 51, No. 2, (Feb. 1999).

* cited by examiner

*Primary Examiner*—Frank M. Lawrence
(74) *Attorney, Agent, or Firm*—Townsend and Townsend and Crew LLP

(57) ABSTRACT

Embodiments of the invention provide a water treatment method and water treatment device capable of automatically tracking the frequency of ultrasonic waves and automatically controlling their amplitude such that optimal cavitation is generated. In one embodiment, a water treatment method of sterilizing water containing microbes comprises supplying ultrasonic vibration to the water to be treated by driving and controlling a transducer of a sterilization cell using a signal; detecting an amplitude of the transducer and a frequency of the signal applied to the transducer; and controlling the amplitude and a vibration frequency of the transducer to target values in accordance with the detected transducer amplitude and the detected signal frequency.

6 Claims, 18 Drawing Sheets results of test of sterilization of Escherichia coil

| Concentration | number of bacteria | Sterilization rate |
|---|---|---|
| Initial Concentration | $8.5 \times 10^5$ bacteria/ml | — |
| Concentration after 1 pass | $6.9 \times 10^5$ bacteria/ml | 19% |
| Concentration after 3 passes | $5.7 \times 10^5$ bacteria/ml | 33% |

Waveforms at
the various sections

Control numerical value NA
and amplitude

WATER TREATMENT METHOD AND WATER TREATMENT DEVICE

CROSS-REFERENCES TO RELATED APPLICATIONS

This application relates to and claims priority from Japanese Patent Application Nos. 2003-069051, filed on Mar. 14, 2003; 2003-078241, filed on Mar. 20, 2003; and 2003-059307, filed on Mar. 6, 2003. The entire disclosures of these applications are incorporated herein by reference.

BACKGROUND OF THE INVENTION

The present invention relates to water treatment methods and devices and, more particularly, to a water treatment method and water treatment device suitable for use for sterilizing microbes in drinking water, a circulatory bath, or the like.

It is previously known that intense ultrasonic waves have a sterilizing effect and sterilizing devices for sterilizing bacteria that cause problems in drinking water or circulatory baths or the like are being developed using the sterilizing effect of such ultrasonic waves. Examples of water treatment devices constituting sterilizing devices of this type are described in Laid-open Japanese Patent Publication No. 2001-9448 and Laid-open Japanese Patent Publication No. 2001-334264. In previous water treatment devices as described above, cavitation is generated by applying ultrasonic waves of large amplitude (about 1 μm) utilizing the resonance of an ultrasonic wave generating mechanism and bacteria are destroyed mechanically by means of the high temperature, high pressure, and high-speed water currents generated on collapse thereof. Although it is commonly stated that sterilization using ultrasonic waves is achieved by oxidation produced by an acousto-chemical effect, if frequencies lower than about 28 KHz are employed, it has been confirmed that bacteria larger than about 5 μm are mechanically disintegrated.

Further, technology relating to ultrasonic wave devices in which the frequency of the ultrasonic waves can be changed so as to maintain the resonance point of an ultrasonic wave resonator that generates ultrasonic waves that fluctuates depending on the condition of the liquid is disclosed in Laid-open Japanese Patent Publication No. H. 6-71226, Laid-open Japanese Patent Publication No. H. 7-265794, and Laid-open Japanese Patent Publication No. 2001-212514.

When water treatment devices described above are actually employed, they are subject to the problem that the frequency of the ultrasonic waves that is optimum for generation of cavitation fluctuates depending on the effect of parameters such as water temperature, flow rate and impurities, so that it is difficult for optimal cavitation to be generated. In addition, if the devices described above are employed in a condition in which water is absent, the amplitude becomes abnormally large, giving rise to the problem that the device is in danger of being destroyed and the further problem that the device itself may be exfoliated by the cavitation generated by the device, causing changes in the resonant frequency.

FIG. 1 shows an example of an ultrasonic device in which sound waves are generated by producing vibration by applying high frequency to a magnetostriction or piezoelectric element have been employed for a long time in the industrial field. As shown in FIG. 1, their basic construction is that a vibrator 3 is introduced into a liquid 2 contained in an enclosure 1 and high frequency from an oscillator 7 is amplified by an amplifier 6. The amplified high frequency signal is applied to a vibration source 4 comprising a magnetostriction or piezoelectric element. This high frequency vibration is transmitted and magnified by passing through a horn 5 and directed into the liquid 2 in the form of a sound wave.

If the acoustic pressure from the vibrator is raised by increasing the power applied to the vibrator 2, the liquid 2 is subjected to a rapid change of pressure, causing the static pressure of the liquid to drop below the vapor pressure, with the result that cavities are generated by air dissolved in the liquid or by vaporization of the liquid. This phenomenon is called cavitation. When the bubbles produced by cavitation collapse, a shock of 1000 to 5000 atmospheres is generated in a short period in a minute region; this has an extremely large destructive power. This action is called cavitational erosion and is being taken up as a research topic in many places, as shown by Okada et al., Machinery Research (Kikai no Kenkyu) Vol. 49, No. 11 (1997) pp 1187 to 1196.

Such cavitation has been employed for a long time in emulsifying devices and ultrasonic washing devices in the industrial field. In FIG. 1, an enclosure 1 is filled with liquid 2 and a plurality of vibrators 3 are arranged therein. The high frequency waves from an oscillator 7 are amplified by an amplifier 6 and applied to a vibration source 4 comprising a magnetostriction or piezoelectric element; the resulting vibration is directed into the liquid 2 from the tip of horn 5.

As disclosed in Kato, Cavitation (New edition) Maki Shoten at p. 84, the number of cavitation bubble nuclei described above is inversely proportional to the diameter of the bubble nuclei. With this device, the acoustic pressure that was applied and the mechanism of bubble generation were not elucidated. Moreover, there were the following problems.

(1) The region where cavitation bubbles were generated was small and it was difficult to produce cavitation in the entire body of liquid.
(2) If cavitation was produced in the entire body of liquid, a large liquid flow rate could not be achieved.
(3) The size of the cavitation bubbles was difficult to control.
(4) Erosion of the tip of the horn occurred due to cavitational erosion, producing particles which became mixed with the liquid.

There have been instances of deaths caused by pneumonia due to Legionella bacteria proliferating in water at hot springs and the social problem has also risen of diarrhea epidemics due to cryptosporidium bacteria present in mains water supplies. It is desirable to provide a device for destroying and sterilizing pathogenic bacteria, in particular, Legionella bacteria, cryptosporidium bacteria or *Escherichia coli* bacteria while maintaining the quality of hot spring water or mains water.

In 24-hour hot-water baths and the like for domestic use, pathogenic bacteria proliferate, and there are reported cases of newborn babies or old persons who have low resistance to bacteria being infected. Previously known methods of sterilization/disinfection of pathogenic bacteria in water include chlorine sterilization, ultraviolet ray sterilization, ozone sterilization and disinfection using membrane filtration. However, in the case of a circulatory hot-water bath, there are respectively the following problems.

(1) Chlorine: this causes a change of the pH value and produces a change of the water quality. It gives an unpleasant feeling to the bather, since a smell of chlorine is generated. The chlorine is consumed simply by persons taking a bath so that no residual chlorine is left; managing the amount of chlorine with each bath is therefore a troublesome task. It is considered that high chlorine concentrations affect the skin. The chlorine is neutralized in 1 to 2 minutes in hot alkaline water of pH greater than 7, falling to a concentration of 0.1 ppm.

(2) Ultraviolet rays: the effectiveness of these is reduced by the fact that they cannot pass through cloudy water. The conditions of use are restricted to colorless transparent hot water, practically equivalent to mains tap water in which the chromaticity of the hot water is less than 5 degrees and which is of turbidity less than 2 degrees.

(3) Ozone: the quality of the hot water is affected by decolorization and deodorization. Furthermore, since high ozone concentrations are toxic to the human body, de-ozonization treatment using activated carbon or the like is required.

(4) Membrane filtration: this is undesirable as a filter for a bath, since bathing agents and the like are removed. Also, blockage of the pores occurs.

Prior examples are found in Laid-open Japanese Patent Application No. H. 2001-9448 and Laid-open Japanese Patent Application No. H. 2001-334264.

BRIEF SUMMARY OF THE INVENTION

Embodiments of the present invention provide a water treatment method and water treatment device whereby automatic tracking of the frequency of the ultrasonic waves such that optimal cavitation is generated, and automatic control of amplitude can be achieved and whereby notification of abnormality can be performed in cases such as where the change of resonant frequency produced by erosion of the device itself exceeds the operating range, or where water is absent and, furthermore, whereby a warning can be generated in cases where either the frequency or amplitude departs from the tracking range. According to another feature of the present invention, cavitation is generated in a liquid using an ultrasonic wave generating device. A construction is adopted such that the cavitation bubbles that are then generated act on the entire body of the liquid. Furthermore, the bubble nuclei that constitute the nuclei for generation of cavitation are selectively employed by controlling the acoustic pressure (frequency and/or amplitude) generated by the vibrator.

In accordance with an aspect of the present invention, a water treatment method of sterilizing water containing microbes comprises supplying ultrasonic vibration to the water to be treated by driving and controlling a transducer of a sterilization cell using a signal; detecting an amplitude of the transducer and a frequency of the signal applied to the transducer; and controlling the amplitude and a vibration frequency of the transducer to target values in accordance with the detected transducer amplitude and the detected signal frequency.

Another aspect of the invention is directed to a water treatment device for sterilizing microbes in water by supplying ultrasonic vibration to the water to be treated by driving and controlling a transducer of a sterilization cell. The device comprises an amplitude sensor configured to detect an amplitude of the transducer; a frequency detection unit configured to detect a signal frequency difference between a vibration frequency of the transducer and a resonant frequency of a vibration system comprising the sterilization cell; an amplitude control unit configured to control the amplitude of the transducer to a target value in accordance with the detected transducer amplitude; and a frequency control unit configured to control a vibration frequency of the transducer to a target value in accordance with the detected signal frequency difference.

In accordance with another aspect of the invention, an ultrasonic device comprises a vibrator configured to be vibrated with high frequency waves and transmit vibrations to a liquid. The vibrator includes a horn with a vibrator tip. A container includes an inlet and an outlet, and a hole disposed between the inlet and the outlet. The hole faces the vibrator tip disposed in the container to direct liquid flow from the inlet to the vibrator tip and out through the outlet. The hole has a size smaller than a size of the vibrator tip of the vibrator. In some embodiments, the vibrator tip comprises a magnetic material, and a magnetic field application device is configured to apply a magnetic field via the magnetic material of the vibration tip to the liquid.

In accordance with another aspect of the present invention, a sterilization device for a bath in which water is accumulated comprises an ultrasonic wave irradiation enclosure in which water is irradiated with ultrasonic waves. The ultrasonic wave irradiation enclosure is configured to be fluidicly coupled with the bath. An ultrasonic wave drive unit is configured to drive the ultrasonic wave irradiation enclosure and to adjust a vibration of the ultrasonic wave irradiation enclosure to produce ultrasonic waves having an intensity so as to generate cavitation in the water in the ultrasonic wave irradiation enclosure.

DETAILED DESCRIPTION OF THE INVENTION

Embodiments of the water treatment methods and water treatment devices according to the present invention are described below in detail with reference to the drawings.

Ultrasonic Device

Figure 1:
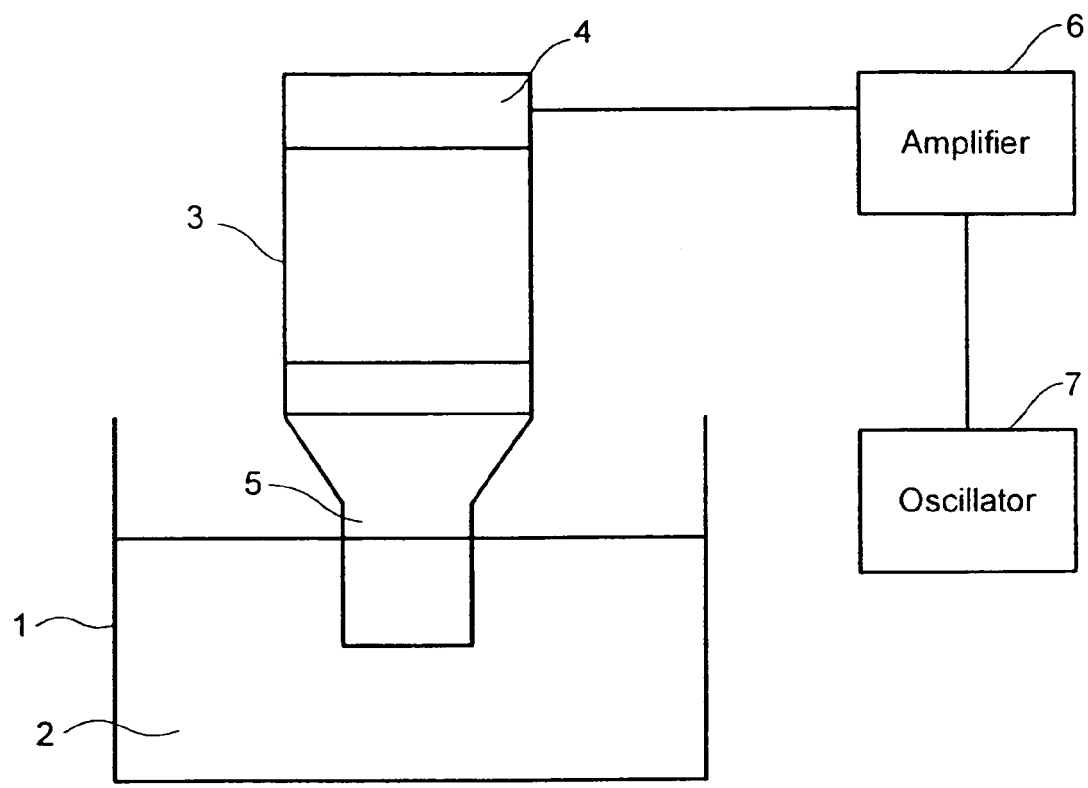
FIG. 1 is a schematic diagram of a prior cavitation generating device using ultrasonic waves.
Figure 2:
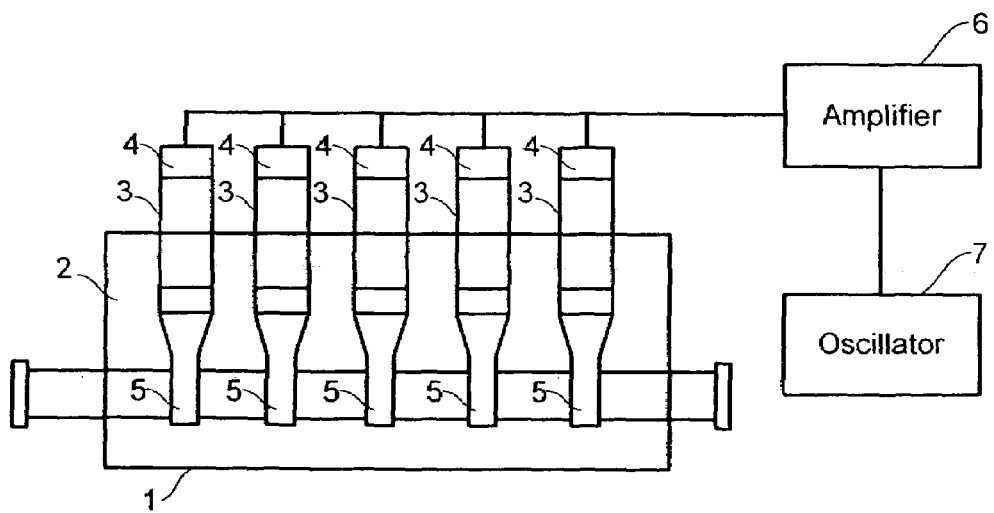
FIG. 2 is a schematic view of prior production machinery using cavitation.
Figures 3, 4:
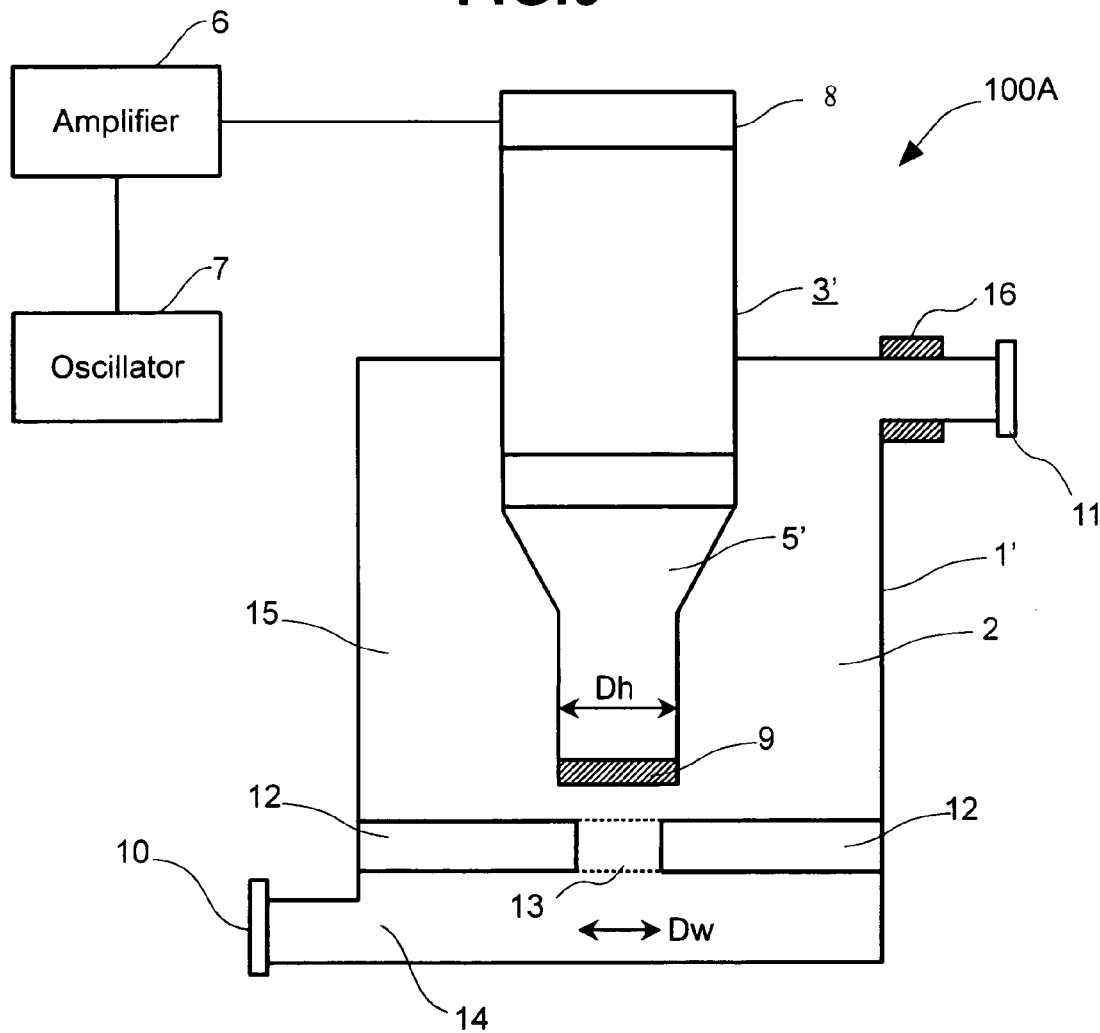
FIG. 3 is a schematic view of an ultrasonic device according to an embodiment of the present invention.
FIG. 4 is a table showing the sterilization effect of an ultrasonic device according to an embodiment of the present invention.

FIG. 3 is a diagram of an ultrasonic device constituting an embodiment of the present invention. High frequency waves from an oscillator 7 pass through an amplifier 6 and are applied to a vibration source 8 of a vibrator 3'. As this vibration source 8, a magnetostriction or piezoelectric element may be selected. The vibration from the vibration source 8 is directed into the liquid 2 in the form of sound waves from the tip 9 of horn 5'. The liquid 2 flows into an ultrasonic device 100A from an inlet port 10 provided with a flange and flows out from an outlet port 11 provided with a flange. The enclosure 1' of the ultrasonic device 100A is divided into an inlet chamber 14 and outlet chamber 15 by a partition 12, these being linked through a non-return hole 13 provided in the partition 12. The liquid 2 flows to the outlet chamber 15 from the inlet chamber 14. Since the diameter of the non-return hole 13 is smaller than the diameter of the tip 9 of the horn and the non-return hole 13 and the vibrator 3' are arranged coaxially, when the liquid flows therethrough under pressure, all of the inflowing liquid passes close to the tip 9 of the horn. Furthermore, the distance between the tip 9 of the horn and the partition 12 is less than the value obtained by dividing the square of the diameter at the tip 9 of the horn by the wavelength of the vibration frequency in the horn. Consequently, if the vibration frequency is taken to be 15 kHz, and the diameter of the tip of the horn is 30 mm, this distance is 9 mm or less. Also, in this case, if the amplitude at the tip of the horn is made to be about 20 μm, bubbles can be generated using cavitation bubble nuclei of about one micrometer, or of one micrometer or less. In this embodiment, the tip 9 of the horn at the vibrator 3' is made of magnetic metal and a magnet 16 is arranged in the vicinity of the inlet/output port 11. The purpose of this is to recover any particles that are sprayed out into the liquid by erosion of the tip 9 of the vibrator due to the cavitational erosion action. In this embodiment, the magnetic field is provided by arranging a magnet 16 outside the piping but it would also be possible to arrange a magnet shaped to the form of a mesh within the piping.

In order to mechanically disintegrate micro-particles or micro-organisms present in the liquid by shock pressure during collapse of cavitation bubbles produced by the ultrasonic waves, it is important to transmit this shock pressure uniformly in the entire body of a given region. As is known, cavitation bubbles are generated by growth of bubble nuclei (initial bubbles) in a liquid. The size, shock pressure on collapse and pressure range of bubble nuclei may be expressed in numerical form using the Rayleigh-Plesset equation and can be calculated using the diameter of the bubble nuclei, the pressure of liquid and the radiated acoustic pressure as parameters. According to this equation, the shock pressure increases with increasing bubble diameter but the number of cavitation bubble nuclei diminishes and the shock pressure density becomes non-uniform. Since the number of cavitation bubble nuclei is inversely proportional to the bubble nucleus diameter, from the Rayleigh-Plesset equation and bubble nuclei numerical density distribution data, it is found that a substantially uniform distribution with no non-uniformity of shock pressure can be achieved if cavitation bubble nuclei are employed having an equilibrium radius of about one μm or less than one μm. Also, the bubble nuclei diameter can be selected by controlling the acoustic pressure (frequency and amplitude) of the vibrator.

Furthermore, the range of the shockwaves that are then generated at high density is only directly below the tip 9 of the vibrator and within an acoustic field region in close proximity with the tip of the vibrator whose depth is given by the value obtained by dividing the square of the diameter of the tip of the vibrator by the wavelength of the ultrasonic waves.

In FIG. 3, the non-return hole 13 has a construction in which the diameter Dw thereof is smaller than the diameter Dh of the vibrator horn; liquid 2 that is fed into the inlet chamber 14 from the inlet 14 is discharged towards the tip 9 of the vibrator through the non-return hole 13 provided in the partition 12 and so passes through the vicinity of the tip 9. In these circumstances, if the distance of the tip 9 of the vibrator and the partition 12 is kept within the close proximity acoustic field region referred to above, the shock pressure of the cavitation bubbles can be made to act in the entire body of the liquid flowing into the outlet chamber 15 through the non-return hole 13.

A test of sterilization of *Escherichia coli* bacteria (XL1-Blue) was conducted using an ultrasonic device having a construction as shown in FIG. 3. The frequency employed was 15 kHz, the output end diameter Dh of the horn tip 9 was 30 mm, the diameter Dw of the non-return hole 13 was 10 mm, the distance between the output tip of the horn 5' and the partition 12 was 3 mm and the input power to the vibrator was 300 W. The amplitude at the horn 5' was then at least 20 μm. FIG. 4 shows the results of a sterilization test conducted at a flow rate of 10 liter/minute, using an *Escherichia coli* sample of initial concentration $8.5 \times 10^5$ bacteria/ml. The sterilization rate on passage once through this device (single pass) was 19% and the sterilization rate for three passes was 33%.

In order to improve the sterilization rate for a single passage, a construction may be adopted wherein a plurality of configurations as shown in FIG. 3 are arranged in series. A sterilization rate of at least 50% within the generation time (period in which multiplication of the micro-organisms results in their doubling in concentration) of the micro-organisms that are the target of sterilization can thereby be obtained.

With this embodiment, the shock pressure on collapse of cavitation bubbles can be made to act uniformly in the liquid with the result that micro-organisms in the liquid can be mechanically disintegrated by this shock pressure. If the micro-organisms are pathogenic bacteria, this can therefore be utilized as a sterilization device. Furthermore, since, in this embodiment, drugs are not employed, there is no possibility of the micro-organisms acquiring resistance.

Figure 5:
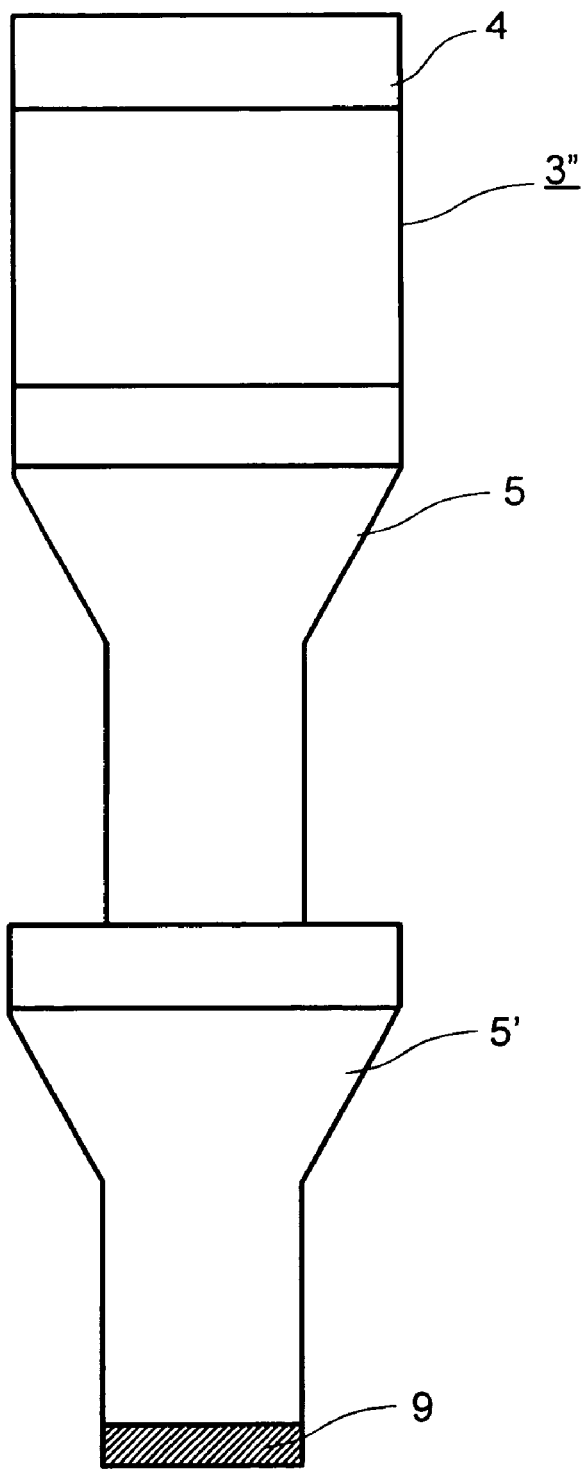
FIG. 5 is a schematic view of an ultrasonic wave vibrator according to an embodiment of the present invention.

Next, another embodiment of the present invention will be described with reference to FIG. 5. FIG. 5 is a diagram of a vibrator and shows an example in which, in order to increase the amplitude of the vibrators 3", a first horn 5 and a second horn 5' are connected, the tips 9 thereof being constituted by magnetic metal. If such vibrators 3" are employed in an ultrasonic device 100A as shown in FIG. 3, the amplitude is made larger, so the sterilization rate is increased.

Figure 6:
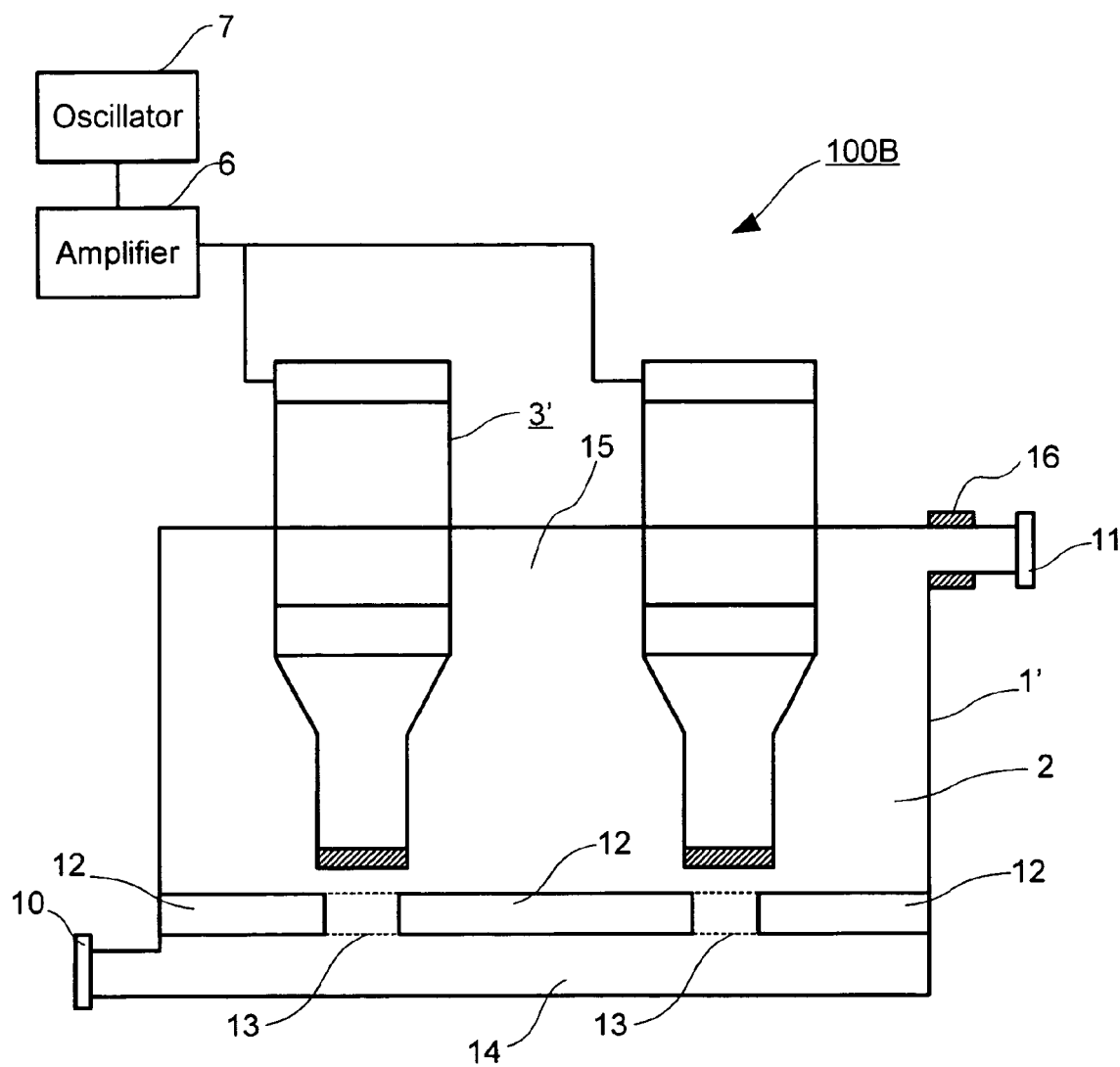
FIG. 6 is a schematic view of an ultrasonic device according to another embodiment of the present invention.
Figure 7:
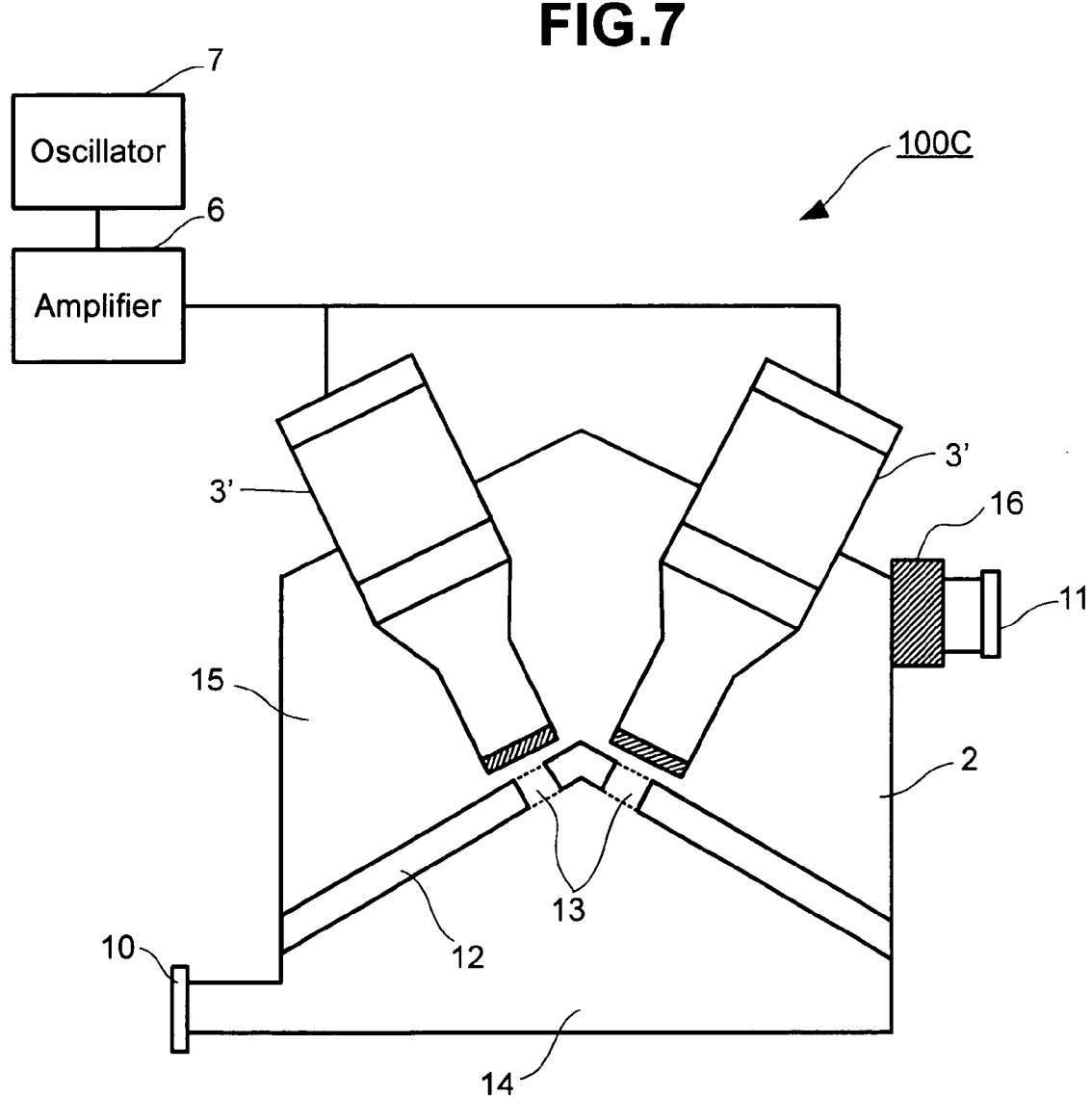
FIG. 7 is a schematic view of an ultrasonic device according to another embodiment of the present invention.

A further embodiment of an ultrasonic device of the present invention is described in FIG. 6. The vibrators 3' are the same as in the case of the first embodiment 100A of FIG. 3; two such vibrators 3' are arranged in parallel. With this ultrasonic device 100B, the flow rate of liquid can be doubled for the same sterilization rate as in the first embodiment 100A. The embodiment 100C shown in FIG. 7 is a modified example of this embodiment 100B. In FIG. 7, the partition 12 is arranged in the form of a hill and the two vibrators 3' are arranged in downwardly converging fashion. With this ultrasonic device 100C also, the liquid flow rate can be doubled for the same sterilization rate as in the first embodiment 100A.

Figure 8:
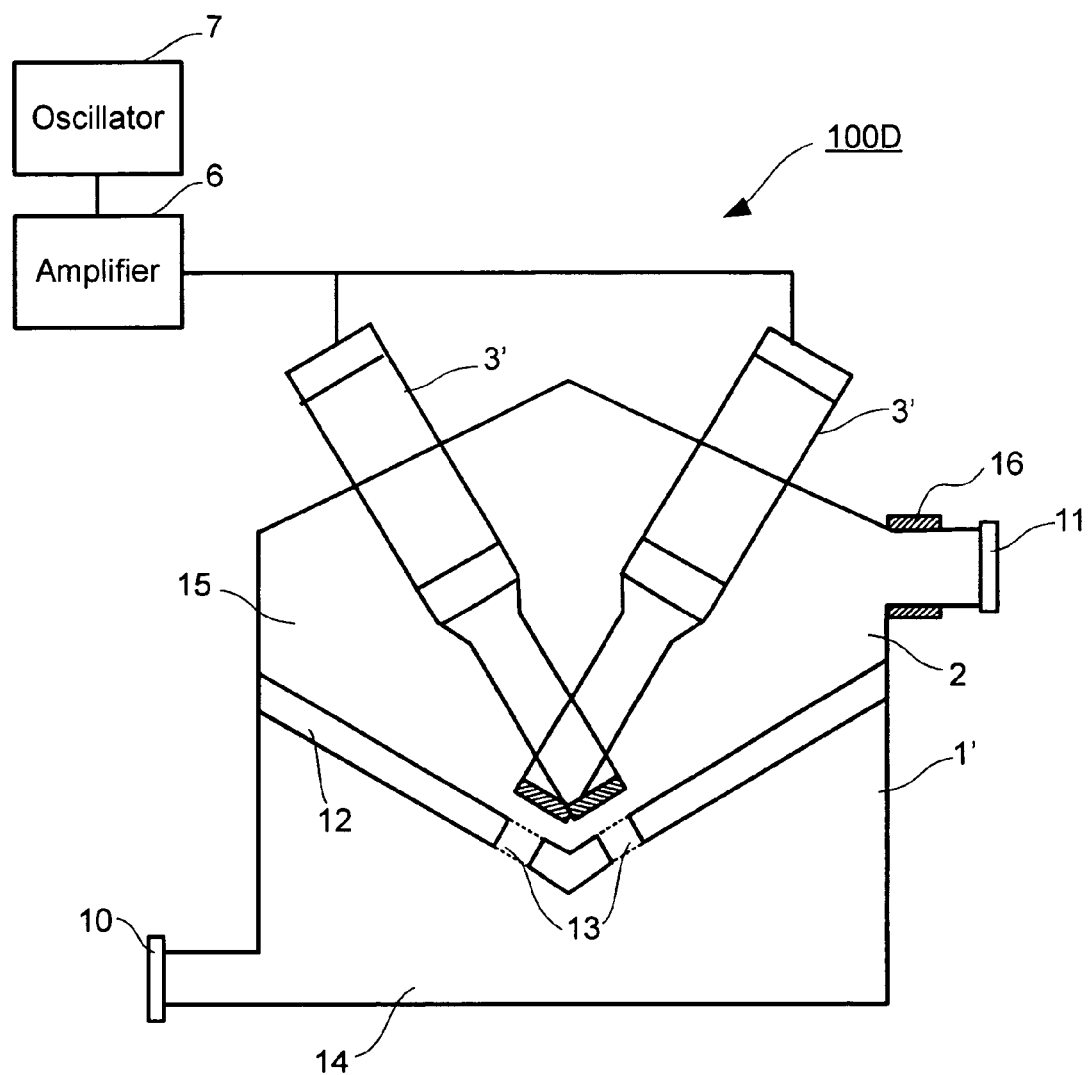
FIG. 8 is a schematic view of an ultrasonic device according to another embodiment of the present invention.
Figure 9:
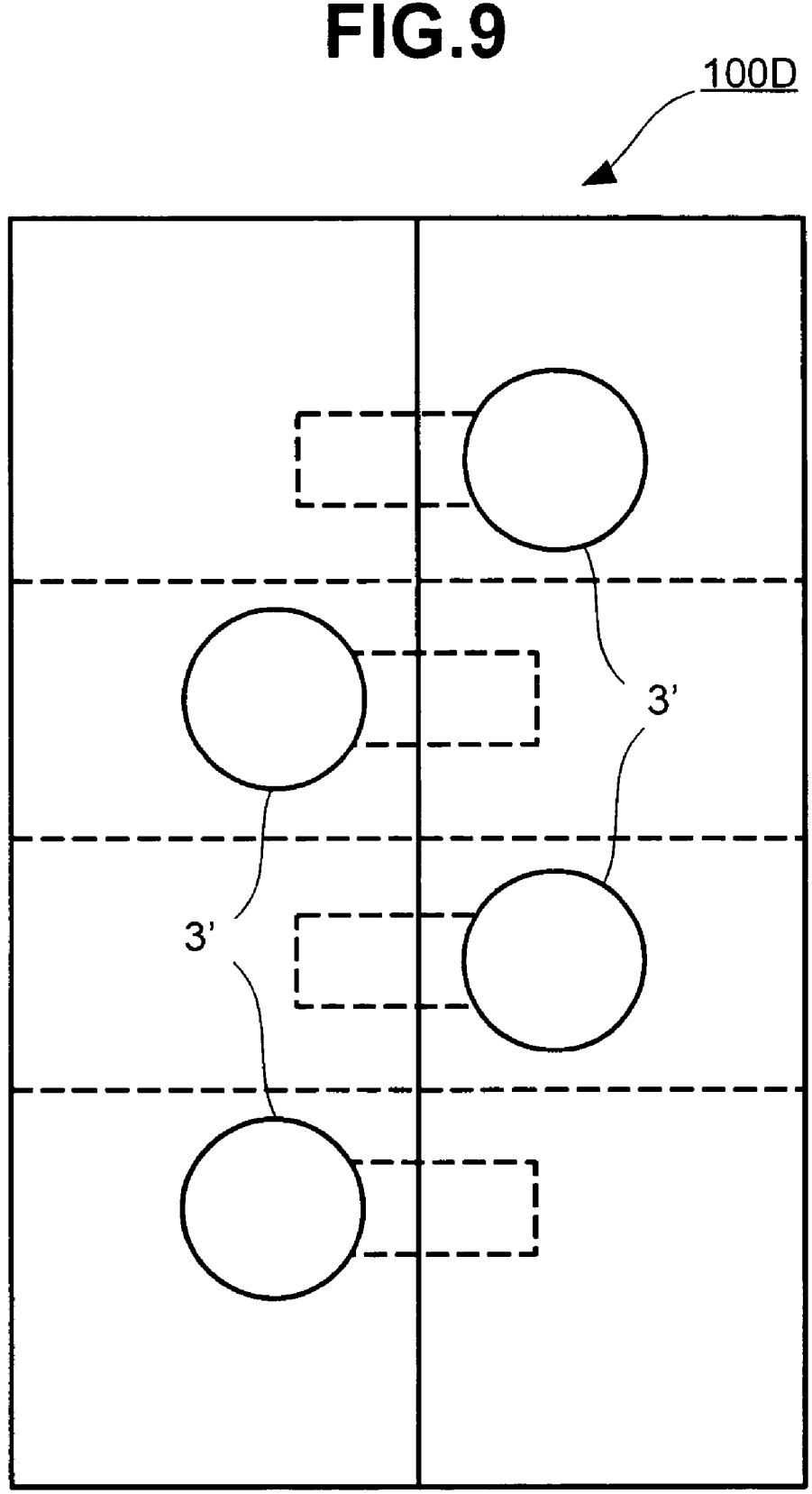
FIG. 9 is a plan view of the ultrasonic device of FIG. 8.

A further embodiment of the ultrasonic device of the present invention is described with reference to FIG. 8 and FIG. 9. FIG. 8 is a diagram of an ultrasonic device 100D and FIG. 9 is a schematic plan view of this diagram. The partition 12 is provided in the form of a valley, and four vibrators 3' are arranged in mutually downwardly converging fashion. With this ultrasonic device 100D, the liquid flow rate can be quadrupled for the same sterilization rate as in the first embodiment 100A. Furthermore, since some of the plurality of vibrators 3' are arranged to overlap in the plane of FIG. 8, the horizontal width of the device can be reduced. Additionally, by providing partitions between the four vibrators 3' that are arranged next to each other as shown by the dotted lines in FIG. 9 and, the benefit is obtained that, depending on the application, the piping can be changed over between an arrangement in which four vibrators are connected in parallel, an arrangement in which four vibrators are connected in series and an arrangement of two vibrators connected in series x two vibrators connected parallel. If this is done, the inlet port and exit port should be suitably arranged.

With the above embodiment of the present invention, cavitation is produced in a liquid using ultrasonic waves and the shock pressure on collapse of the cavitation bubbles can be made act uniformly in a region, thereby making it possible to achieve mechanical disintegration of micro-particles or micro-organisms in the liquid by means of this shock pressure. The device can be utilized as a sterilization device for micro-organisms including pathogenic bacteria and microbes. These embodiments 100A–100D may be used in the water treatment apparatus described hereinbelow.

Water Treatment Method and Apparatus

Figure 10:
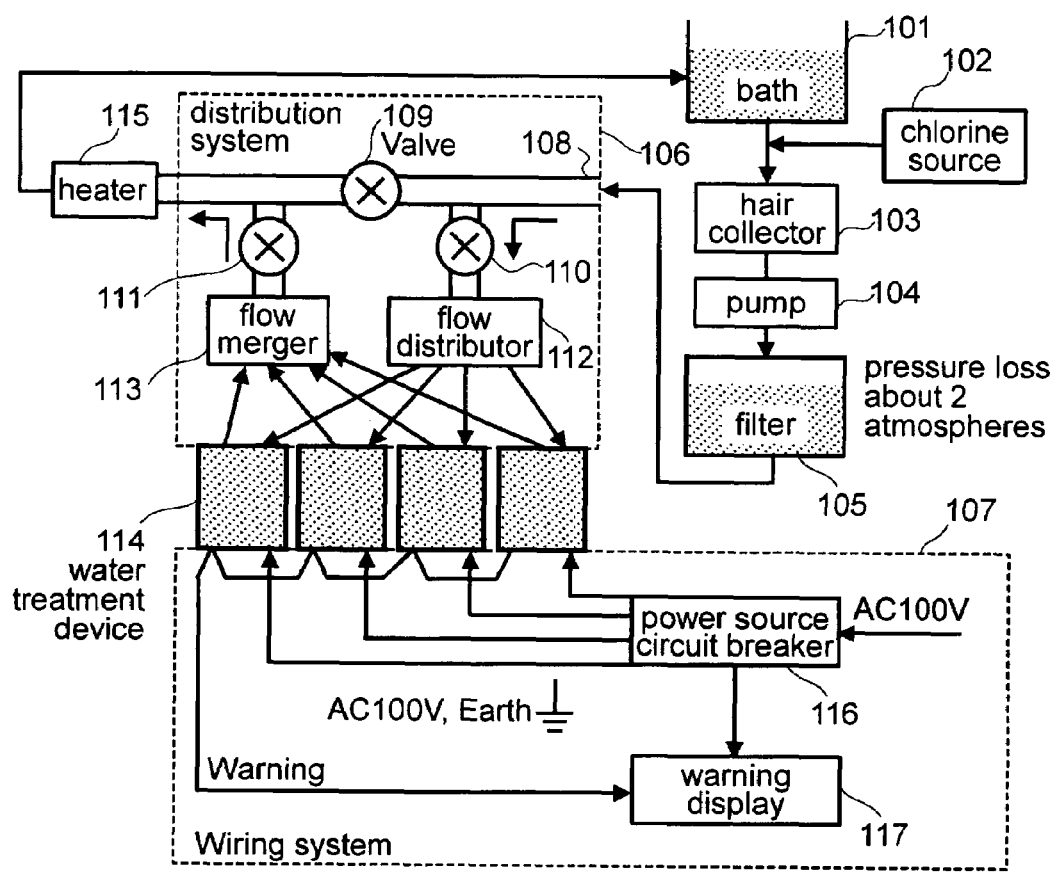
FIG. 10 is a block diagram showing the system layout in the case where a water treatment device according to an embodiment of the present invention is employed for sterilization of a circulatory bath.
Figure 11:
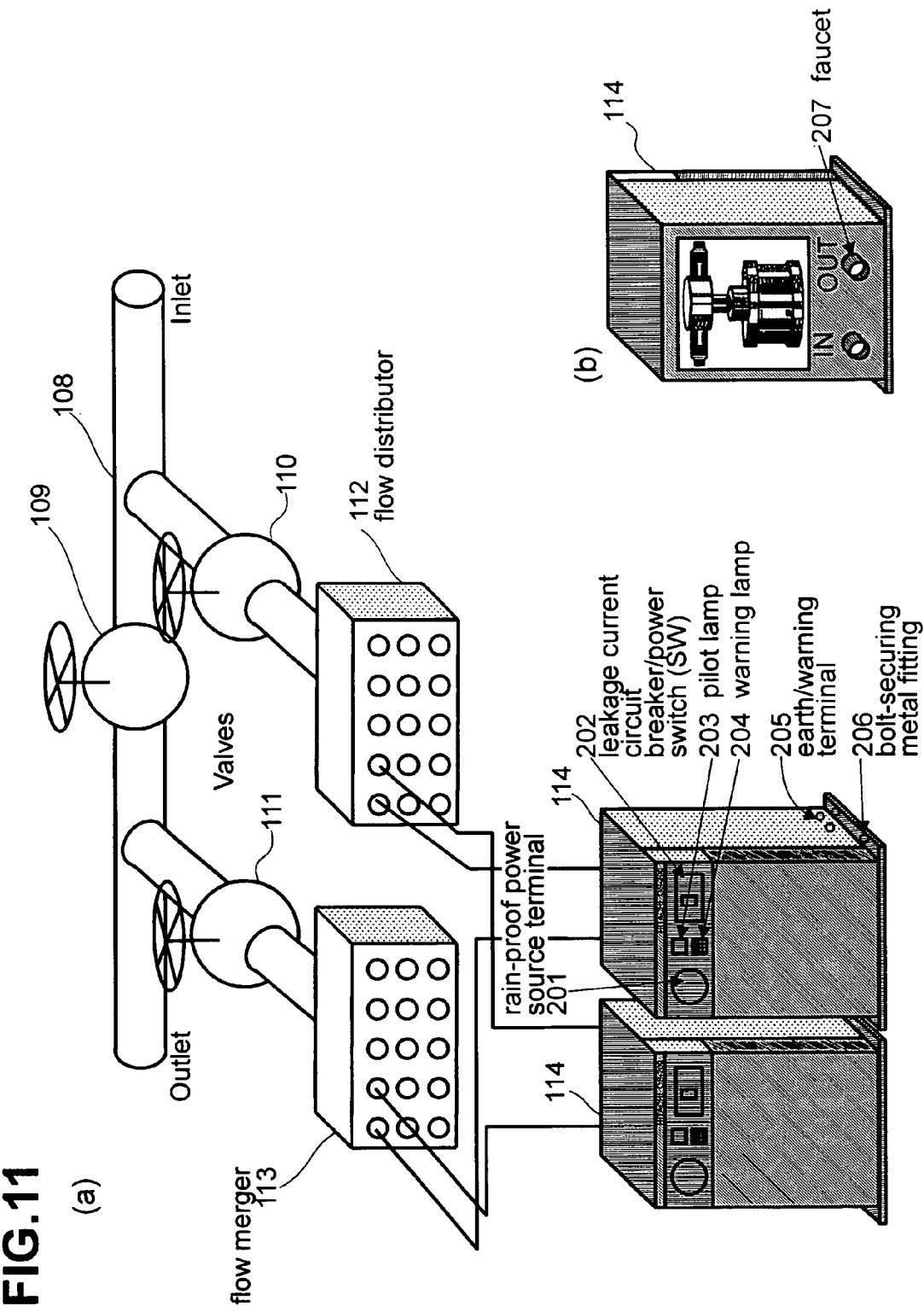
FIG. 11 is a view showing the layout of the distribution system in FIG. 10.

FIG. 10 is a block diagram showing a system layout in the case where a water treatment device according to an embodiment of the present invention is employed for sterilization of a circulatory bath. FIG. 11 is a view showing the layout of the distribution system in FIG. 10. In FIG. 10 and FIG. 11, 101 is a bath, 102 is a chlorine source, 103 is a hair collector, 104 is a pump, 105 is a filter, 106 is a distribution system, 107 is a wiring system, 108 is a distribution pipe, 109 to 111 are valves, 112 is a flow distributor, 113 is a flow merger, 114 is a water treatment device, 115 is a heater, 116 is a power source circuit breaker, 117 is a warning display device, 201 is a rain-proof power source terminal, 202 is a power leakage circuit breaker/power source switch (SW), 203 is a pilot lamp, 204 is a warning lamp, 205 is an earth/warning terminal, 206 is a bolt-securing metal fitting, and 207 is a faucet.

The construction of a system according to an embodiment of the present invention in which one or a plurality of water treatment devices 114 are employed for sterilization of a circulatory bath comprises, as shown in FIG. 10, a chlorine source 102 that performs chlorine disinfection during circulation of the water in the bath 101, a hair collector 103 that removes comparatively large particles of dirt and the like, a pump 104 for circulating water, a filter 105 that removes fine particles of dirt, a distribution system 106 that sterilizes the water after filtration by feeding this water to a water treatment device 114 according to an embodiment of the present invention, and a heater 115 that heats the water after sterilization; after heating, the water is returned to the bath 101.

The distribution system 106 comprises two distribution branch pipes 108, a valve 109 provided at the mid-point of the two branches, valves 110 and 111 provided for the respective two distribution branch pipes, a flow distributor 112 provided at the tip of the distribution pipe that is branched on the upstream side, and a flow merger 113 that is provided at the tip of the distribution pipe that is branched on the downstream side. As shown in FIG. 11(a), distribution pipes (shown by the fine lines in FIG. 11(a)) of the flow distributor 112, that distribute water prior to treatment are connected to one or a plurality of water treatment devices 114 and distribution pipes that take in water after treatment from the water treatment device 114 are connected with the flow merger 113.

100 V AC power is supplied through the power source circuit breaker 116 to the one or plurality of water treatment devices 114 and a wiring system 107 for displaying a warning is connected with the warning display device 117. In the interior of the water treatment devices 114, there is provided a sterilizing cylinder constituting a sterilizing device employing ultrasonic waves, as will be described. As shown in FIG. 11(a) and FIG. 11(b), a water treatment device 114 is constituted of the approximate size: width dimension 30 cm, depth dimension 30 cm and height dimension 40 cm; the electrics side and the water side are separately arranged at the front face and rear face of the casing of the water treatment device 114, a rain-proof power source terminal 201, leakage current circuit breaker/power source SW202, pilot lamp 203, warning lamp 204, earth and warning terminal 205 being arranged at the front face of the casing and faucets 207 for pipes connected to the flow distributor 112 and flow merger 113 being arranged at the rear face. In addition, although not shown in FIG. 11, a bolt-securing metal fitting 206 is provided in a flange-shaped portion of the bottom face of the casing.

In the operating condition, the sterilizing system of the circulatory bath shown in FIG. 10 and constructed as described above is employed in a condition in which the valve 109 is closed and the valves 110, 111 are open. Water passing through the filter 105 is supplied to a plurality of water treatment devices 114 through the valve 110 and flow distributor 112 and, after sterilization by ultrasonic waves by the water treatment devices 114 as will be described in detail later, is fed to a heater 115 through the flow merger 113 and valve 111, so that it is returned to the bath after heating to the prescribed temperature in the heater 115.

Figure 12:
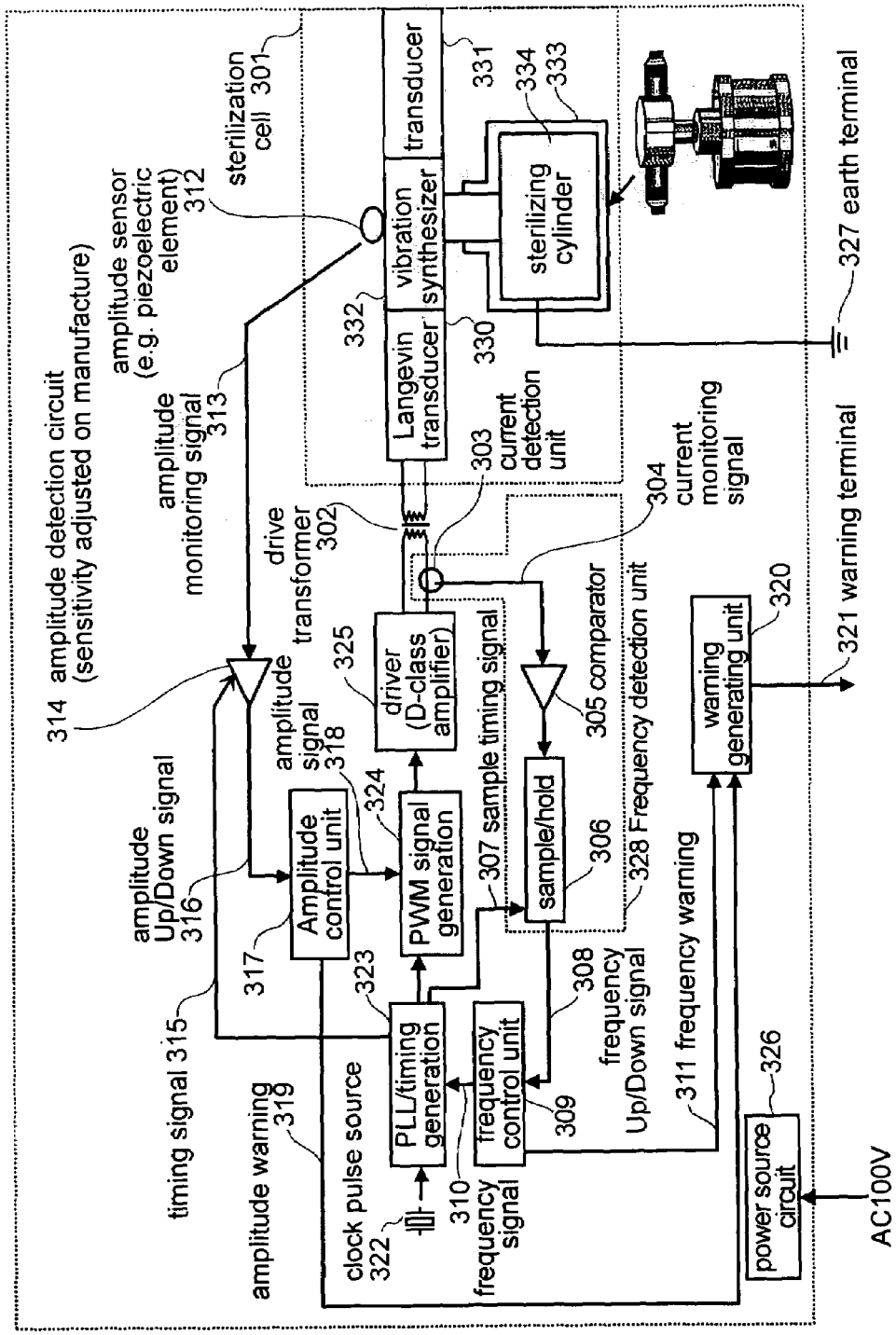
FIG. 12 is a block diagram showing the layout of a water treatment device according to an embodiment of the present invention.

FIG. 12 is a block diagram showing the layout of a water treatment device according to an embodiment of the present invention. Next, the layout of a water treatment device 114 when connected up will be described by FIG. 10 and FIG. 11 with reference to FIG. 12. In FIG. 12, 301 is a sterilization cell, 302 is a drive transformer, 303 is a current detection unit, 305 is a comparator, 306 is a sample/hold circuit, 309 is a frequency control unit, 312 is an amplitude sensor, 314 is an amplitude detection circuit, 317 is an amplitude control unit, 320 is a warning generating unit, 321 is a warning terminal, 322 is a clock pulse source, 323 is a PLL/timing generating circuit, 324 is a PWM signal generating circuit, 325 is a driver, 326 is a power source circuit, and 327 is an earth terminal, 328 is a frequency detection unit, 330 and 331 are transducers, 332 is a vibration synthesizer, 333 is a cylindrical enclosure, and 334 is a sterilizing cylinder. As shown in FIG. 12, a water treatment device according to an embodiment of the present invention is constituted by a sterilization cell 301, constructed as will be described, a drive circuit that drives the transducers 330, 331 within the sterilization cell 301, and a power source circuit 326 that supplies the necessary power to the drive circuit.

In FIG. 12, a sterilization cell 301 is constituted such that a sterilizing cylinder 334 made of a block of metal is provided in the interior of a cylindrical enclosure 333, the water to be treated is supplied from the bottom face of the cylindrical enclosure 333 between the sterilizing cylinder 334 and the inside wall of the cylindrical enclosure 333 and the water that has been subjected to sterilization treatment is fed out from the top of the cylindrical enclosure 333. The sterilizing cylinder 334 is coupled with a vibration synthesizer 332 that synthesizes the vibration of two Langevin transducers 330, 331 that are driven in the ultrasonic range and the vibrations transmitted from the vibration synthesizer 332 are transmitted to the water flowing past the periphery thereof. The microbes present in the water are sterilized by the cavitation produced by the vibration of the ultrasonic waves that are applied to the water flowing past the periphery of the sterilizing cylinder 334.

When seen from the drive circuit that drives the transducers 330, 331, the entire mechanical section including the transducers 330, 331, vibration and synthesizer 332 and sterilizing cylinder 333 in the sterilizing cell 301 described above constitutes a resonator; the frequency of the signal that is applied to the transducers 330, 331 is set at the resonant frequency. Cavitation can thereby be generated by efficiently supplying large vibrations to the water to which the signal is to be applied. Sometimes, however, the resonant frequency may drift, as described above, due to the effect, for example, of water temperature/flow rate/impurities. In an embodiment of the present invention, it is arranged to perform tracking control of the frequency that is applied to the transducers in response to the drift of resonant frequency of the mechanical section described above and to exercise control of the amplitude thereof also such that this is maintained at a set magnitude.

Next, the drive circuit whereby the frequency and amplitude are controlled and drive control of the transducers 330, 331 is exercised as described above will be described. The PLL/timing generating circuit 323 receives a signal from the clock pulse source 322 that constitutes the timing source in respect of the drive circuit according to this embodiment of the present invention and is constituted by a digital circuit, synthesizes a frequency dependent on the frequency signal for driving the transducers 330, 331, transfers this frequency signal to the PWM signal generating circuit 324 that generates a sine wave in accordance with the pulse width modulating signal, and supplies a sample/timing signal 307 to the sample/hold circuit 306 in the frequency detection unit 328 and supplies a timing signal 315 to the amplitude detection circuit 314, whose sensitivity is adjusted during manufacture.

The PWM signal generating circuit 324, after it has received the frequency signal from the PLL/timing generating circuit 323, generates a PWM signal corresponding to this frequency signal, by generating a sine wave based on the pulse width modulation signal, and supplies this PWM signal to the driver 325. The driver 325 is constituted by a D-class amplifier (an amplifier that amplifies a digital binary signal 0, 1 to a large voltage). Compared with A-class, B-class and the like linear amplifiers, a D-class amplifier that performs amplification of a binary signal may be constituted by switches and can perform amplification with higher efficiency. The signal amplified by the driver 325 is applied to the transducers 330, 331 of the sterilization cell 301 through a drive transformer 302 that performs impedance matching between the driver and the transducers and is thus used for sterilizing, as described above, the water flowing through the interior of the sterilization cell 301.

On the primary side (the side connected with the driver 325) of the drive transformer 302 described above, there is provided a frequency detection unit 328 constituted by a current detection unit 303, comparator 305 and a sample/hold circuit 306. The current detection unit 303 comprises a transformer and a resistor and other items and detects current flowing in the drive transformer 302 and supplies a current monitoring signal 304, constituting a signal corresponding to the detected current, to the comparator 305 that compares its input voltage with a reference voltage and outputs a binary value of the magnitude thereof.

The sample/hold circuit 306 stores and holds the output from the comparator 305 at the time-point indicated by the sample timing signal 307. The sample timing signal 307 is a signal indicating the timing at which the current should become 0, i.e., a signal indicating the zero crossover point of the frequency signal that is output by the PLL/timing generating circuit 323 to the PWM generating circuit 324, if the currently generated frequency is the resonant frequency of the sterilization cell. The signal from the sample/hold circuit 306 is supplied to the frequency control unit 309 as a frequency Up/Down signal 308, which is a signal that supplies instructions to raise or lower the frequency.

The frequency control unit 309, on receiving the frequency up/down signal 308, supplies a frequency signal 310 indicating the frequency that is to be output for controlling the frequency of the frequency signal generated by the PLL/timing generating circuit 323 to the timing generating circuit 323 and, if frequency control has become necessary due to a large change of the frequency, departing from the prescribed frequency, supplies a frequency warning signal 311 that gives warning of abnormality, to the warning generating unit 320.

In addition, an amplitude sensor 312 that generates a signal corresponding to the amplitude produced by, for example, a piezoelectric element is mounted in the vibration synthesizer 332 of the sterilization cell 301 and an amplitude monitoring signal 313 that indicates the magnitude of the amplitude from this amplitude sensor 312 is supplied to the amplitude detection circuit 314. Typically, an acceleration sensor is employed as this amplitude sensor 312; a typical example of an amplitude sensor is a piezoelectric element;

apart from this, an acceleration sensor or the like using a micromachine could be employed.

Under the control of a timing signal 315 indicating the timing for evaluating the amplitude, the amplitude detection circuit 314 detects the amplitude monitoring signal 313 from the amplitude sensor 312, which alternates with the frequency (in this embodiment a frequency of 28 KHz is employed, but, in general, an ultrasonic frequency of 10 KHz to a few MHz may be employed) that is supplied to the transducers 330, 331, converts this amplitude monitoring signal 313 to a DC level and compares the magnitude of the amplitude with a prescribed value to generate an amplitude Up/Down signal 316 indicating the direction of magnitude control, which is then supplied to the amplitude control unit 317.

The amplitude control unit 317 uses the amplitude Up/Down signal 316 to correct the amplitude signal and transfers an amplitude signal 318, which is a signal indicating the amplitude to be output, to the PWM signal generating circuit 324 and supplies to the warning generating unit 320 an amplitude warning signal 319, which is a warning that is generated if amplitude control has become necessary due to departure thereof from the prescribed amplitude range.

As already described, the warning generating unit 320 outputs a warning signal to the warning terminal 321 on receipt of the frequency warning signal 311 and amplitude warning signal 319 (or, apart from these, for example, a power source warning). The signal that is output to the warning terminal 321 gives notification to the outside of abnormality by being employed for driving, for example, a warning tone or warning lamp. Thus, it is possible to automatically track the frequency of ultrasonic waves such that optimal cavitation is generated and to perform automatic control of amplitude; notification can be given of abnormality in cases where the change of resonant frequency produced by erosion of the device itself exceeds the operating range, or in cases where water is absent, for example, and warning can be given in cases where either of the frequency or amplitude departs from the tracking range. An abnormal magnitude of the signal frequency is outside a preset frequency range that is within a few percents (e.g., within about 5%) of the resonant frequency. An abnormal magnitude of the amplitude is outside a preset amplitude range between a minimum amplitude where water is absent or too much air is present and a maximum amplitude where the device is in danger of being destroyed. The minimum amplitude and maximum amplitude can be determined experimentally.

The drive circuit constituted as described above performs the functions of frequency tracking, amplitude tracking and warning in respect of the drive frequency for the transducers. Next, an outline of these functions will be given.

(1) Frequency Tracking

The transducers and vibration synthesizer of the sterilization cell 301, viewed as a whole from the electrical point of view, constitute a resonator, the phase of whose current, with respect to the applied voltage, changes in the vicinity of the resonance point from the equivalent circuit seen from the drive circuit. In this embodiment of the present invention, the phase is detected and if the phase is in a region in which this phase is a monotonic function with respect to frequency, the frequency can be made to converge to a stable point by raising or lowering the frequency in response to leading or lagging of the phase.

Detection of the phase is performed by sampling the current at a particular phase of the voltage (adjusted on shipping); as will be described, the current is arranged to be sampled with the timing of the zero crossover point in the resonant frequency. As already described, current detection is performed by a method employing a low resistance or transformer coupling. The detected current value is obtained as a voltage value which is compared with a comparison voltage; the magnitude of the result of the comparison is stored in D-FF and is used to correct the numerical value of the frequency, by employing an Up/Down counter (hereinbelow referred to as a UDC). The actual frequency is produced by the PLL, using the numerical value of the frequency as the frequency division ratio.

(2) Amplitude Tracking

The same control as in the case of frequency control is performed by observing the amplitude by fixing an amplitude sensor using an acceleration sensor such as a piezoelectric element in the resonance system constituted by the transducers and vibration synthesizer of the sterilization cell 301, comparing the magnitude of the amplitude with a fixed value (adjusted on shipping) and providing an Up/Down counter (UDC) that, as a result, corrects the amplitude to make the amplitude smaller if it is too large.

(3) Warning

Various disturbances may affect the device; provided these are within the range of controllability, no warning need be generated, but if they depart from the range of controllability, a warning is produced. Detection of departure from the range of controllability can be performed by monitoring overflow of each final-stage UDC. Since the water treatment device according to this embodiment of the present invention operates in a location where there are no people, it is arranged that not only is a warning generated for the unit device itself but also warning signals are connected up between devices and warnings can be generated for an operator or at a cabinet panel.

Figure 13:
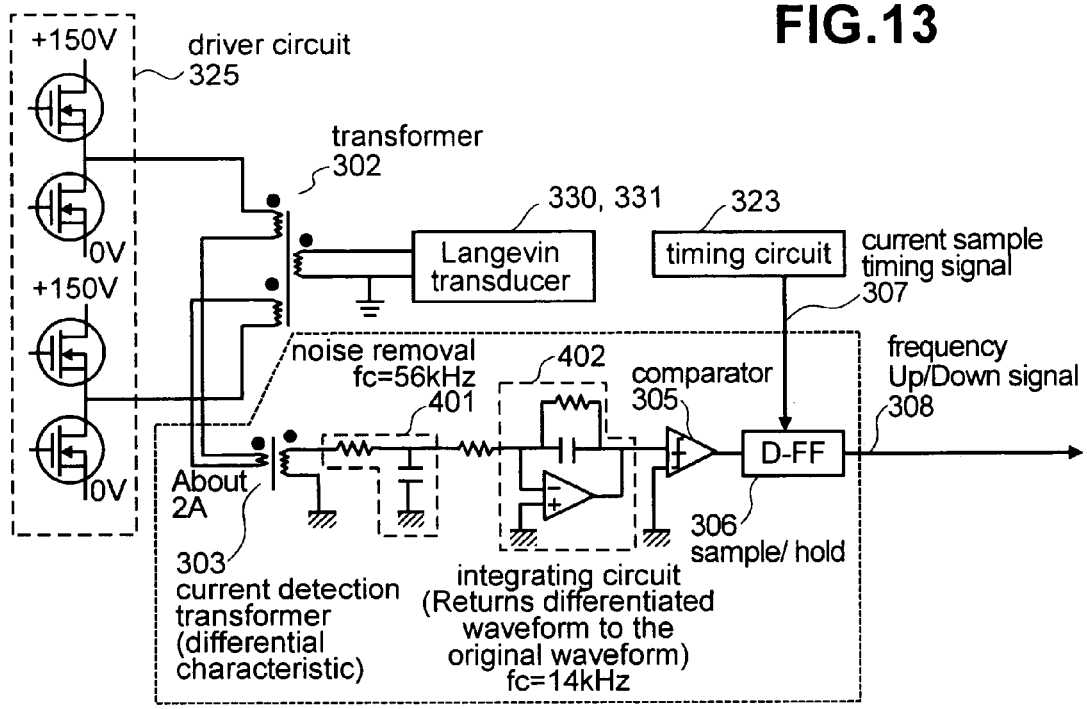
FIG. 13 is a block diagram showing the detailed layout of a frequency detection unit.
Figure 14:
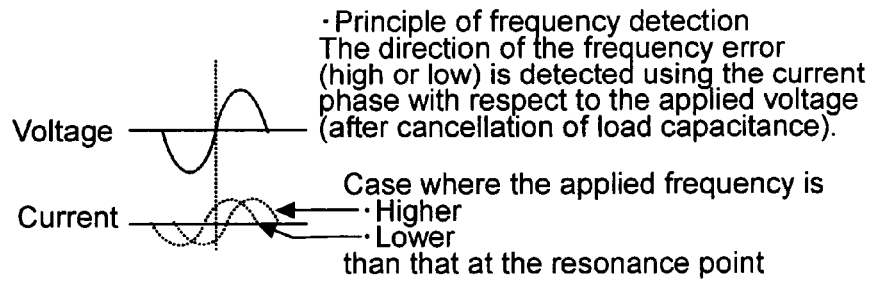
FIG. 14 is a view showing the principles of frequency detection.
Figure 15:
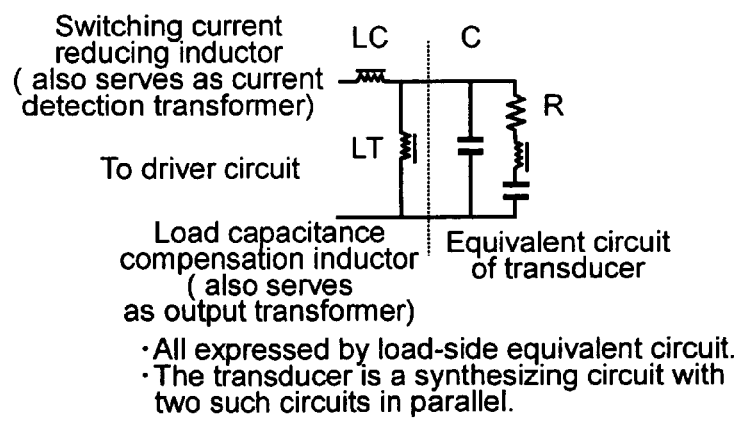
FIG. 15 is a view showing an equivalent circuit of a drive transformer.

FIG. 13 is a block diagram showing the detailed layout of a frequency detection unit 328. FIG. 14 is a view given in explanation of the principle of frequency detection. FIG. 15 is a view showing an equivalent circuit of the drive transformer 303. Next, the layout of the frequency detection unit 328 and the treatment operation will be described with reference to these figures. In FIG. 13, 401 is a noise removal filter, 402 is an integrating circuit and the other symbols represent the same items as in the case of FIG. 12.

As shown in FIG. 13, the current detection unit 303 that is included in the frequency detection unit 328 is constituted by a current detection transformer that is connected between the two primary windings of a drive transformer 302 that receive the two signals from the driver 325, to be described. A noise removal filter 401 constituted by a resistance and capacitor and having a differential characteristic is provided on the secondary winding side of the transformer of the current detection unit 303. In this embodiment of the present invention, a signal of frequency 28 KHz is employed and the cut-off frequency of the noise removal filter 401 is set at 56 KHz. The signal after noise removal is applied to the comparator 305 through an integrating circuit 402 constituted by a differential amplifier and a parallel circuit of a resistance and capacitor provided in the feedback circuit thereof. The integrating circuit 402 serves to return the signal of differentiated waveform produced by the differentiation characteristic of the noise removal filter 401 to its original form; in the case of this embodiment of the present invention, its cut-off frequency is set at 14 KHz.

The comparator 305 compares the input voltage that is supplied through the integrating circuit 402 with a reference voltage which is at ground potential, outputs a binary value of the magnitude thereof, and inputs this to the sample/hold circuit 306. The sample/hold circuit 306 is constituted by a D-FF and, as already described, stores and holds the output from the comparator 305 at the time-point indicated by the sample timing signal 307, and outputs a frequency Up/Down signal 308 to the frequency control unit 309.

The principle of frequency detection is shown in FIG. 14. In general, the phase of the current changes with respect to the voltage depending on whether the frequency that is supplied at the resonance point of the transducers is high or low. Specifically, at the resonance point of the transducer, the transducer constitutes a purely resistive load as seen from the driver but, if frequency drift takes place, the current phase changes, appearing as L or C. Consequently, if the current is sampled with the timing of the zero crossover point of the applied voltage (under these conditions the current is also zero) when the load is purely resistive, it is possible to ascertain whether the applied frequency has drifted higher or lower depending on whether this detected value is positive or negative, and the frequency signal generated by the PWM signal generator 324 can thereby be controlled so as to coincide with the resonance point of the transducer.

As shown in FIG. 15, the equivalent circuit of the resonator comprises a series circuit of resistance R, inductance and capacitor connected in parallel with a capacitor C. Also, the current detection transformer constituting the current detection unit is designed so as to also serve as a switching current reducing inductor LC and the drive transformer is designed so as to constitute a load capacitance compensation inductor LT. It should be noted that it would also be possible to arrange for the drive transformer to also serve as the switching current reducing inductor LC, in other words, for the drive transformer to serve as both the switching current reducing inductor LC and the load capacitance compensation inductor LT.

Since, in the equivalent circuit shown in FIG. 15, both series resonance of the mechanical system and parallel resonance produced by the load capacitance and compensating inductor are present, it is possible for the relationship of whether the drift of the applied frequency is on the high side or the low side with whether the detected value of the current is positive or negative to be reversed, so it is necessary to ascertain this relationship beforehand. In this embodiment of the present invention, the Q of the mechanical system is about 20 and the Q of the compensation system is smaller than 1, so the mechanical system is dominant, but the results of tests have shown that it is possible for the direction of control to be reversed.

Thus, in this embodiment of the present invention, the current in respect of the transducer is detected on the primary side of the drive transformer 303. The reason for this is that, if the current were measured on the secondary side, measurement error would be produced due to the current flowing in the load capacitance and the compensating inductor, so, in order to avoid this and in order to enable the transformer for current measurement to serve also as a switching current reduction inductor, the current in respect of the transducer is detected on the primary side of the drive transformer 303.

Next, design of the load capacitance compensation inductor LT will be explained. Let us now assume that $\omega 0=2\pi \cdot 28.0$ KHz. The inductance in series with R in FIG. 15 and the capacitor then resonate, producing 0 Ω. Consequently, LT and C may be allowed to resonate. In this case, it will be assumed that the exciting inductance of the drive transformer is utilized as LT.

From $\omega 0$. $LT=1/(\omega 0 \cdot C)$, $$LT=1/((\omega 0)2 \cdot C) \qquad \text{(expression 1)}$$

and the allowed deviation of LT is $$\pm LT/\sqrt{(Q \cdot 10)} \qquad \text{(expression 2)}$$

A smaller value may be employed instead of the numerical value 10 in this expression 2 if there is some margin available in respect of the driver. $Q=\omega 0 \cdot LT/R$. Taking a specific example, if C=7900 pf and R=37 Ω, LT=4.0 mH and the allowed deviation is about ±1 mH, Q=0.05.

Next, the design of the switching current reduction inductor LC will be explained. If the resonant frequency of the transducer is 28 kHz, no problems can arise, since the transducer, constituting the load, appears as a pure resistance, due to compensation by LT; however, at harmonic frequencies produced by the switching, LT and C do not resonate, so load appears as C. In that case, when the output voltage from the driver is switched, a large current flows in C, which may either damage the transistors constituting the driver or adversely affect power efficiency.

Consequently, in this embodiment of the present invention, the current during switching is reduced by insertion of LC in series. A side-effect of the insertion of LC is that an action is produced tending to impede the passage of current at the fundamental frequency of 28 kHz but, in this embodiment of the present invention, the loss at the fundamental frequency is designed to be kept to about 1 dB.

Since the transmission characteristic=$1/(1+j\omega 0 \cdot LC/R)$ (expression 3)

LC when the loss is 1 dB ((1/1.122) is $$LC=\sqrt{((1.122)2-1)} \cdot R/\omega \qquad \text{(expression 4)}$$

However, this value must be converted to a value on the primary side, so, if the step-up ratio of the voltage of the drive transformer is n, this results in a factor of $1/n^2$. It will be assumed that the allowed deviation in LC is ±20%.

At this point, the seventh harmonic of the current flowing in the driver is a factor of $$R/(7 \omega 0 \cdot LC) \qquad \text{(expression 5)}$$

with respect to the fundamental.

Taking a specific example, under the same conditions as described above, with LC=1.106 mH/$n^2$, the ratio of the transmission characteristic of the seventh harmonic with respect to the fundamental is 0.28.

Typically, the level of harmonics is smaller than that of the fundamental, but there are a lot of harmonics of about the ninth and 11th order. Consequently, in cases where it is found, by a joint study of, for example, the power source efficiency and rating of the transistors that a considerable problem exists with regard to the load, instead of increasing the value of LC, it may be arranged to effect passage of the fundamental wave by inserting a capacitor in series, i.e., by creating resonance at the central frequency by means of LC and the inserted capacitor, so that the impedance presented by LC and the capacitance of the inserted capacitor is 0 at the central frequency.

Figure 16:
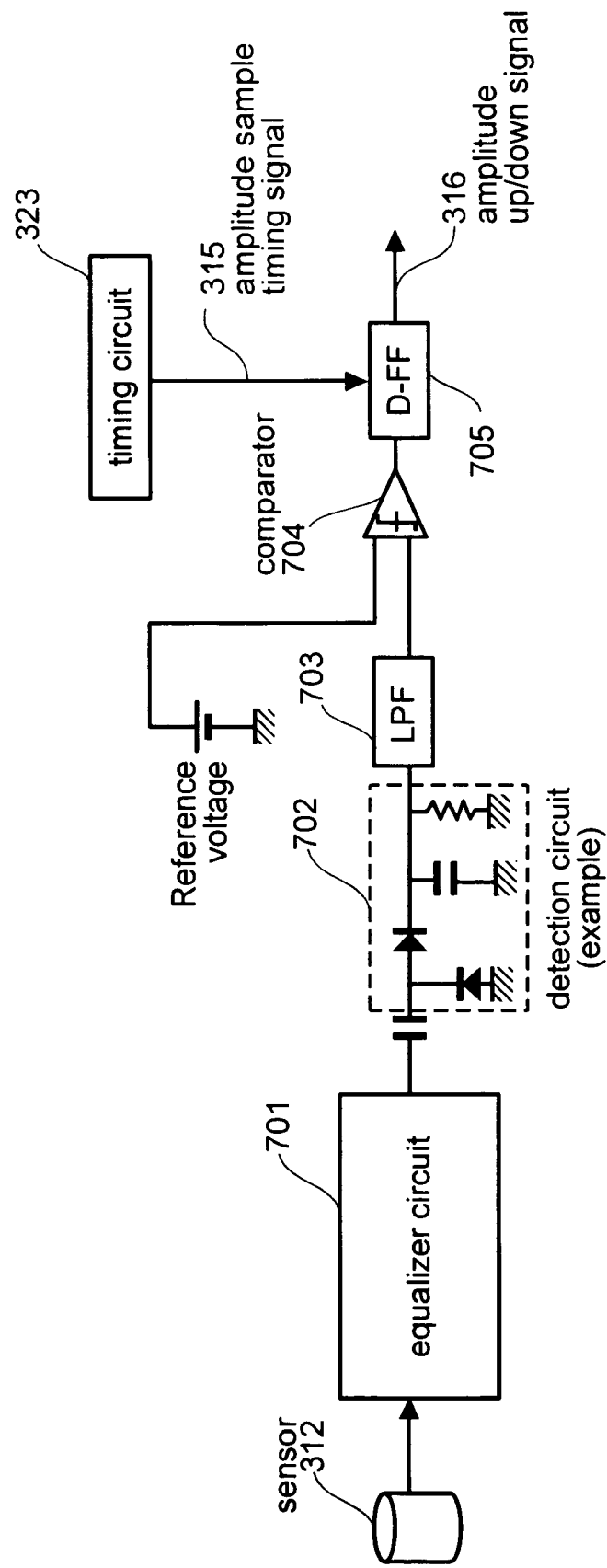
FIG. 16 is a block diagram showing the detailed layout of an amplitude detection circuit.

FIG. 16 is a block diagram showing the detailed construction of the amplitude detection circuit 314. Next, the construction and processing operation of the amplitude detection circuit 314 will be described with reference to FIG. 16.

In FIG. 16, 701 is an equalizer circuit, 702 is a detection circuit, 703 is an LPF (low pass filter), 704 is a comparator, 705 is a D-FF and the other symbols have the same meaning as in the case of FIG. 12.

As shown in FIG. 16, the amplitude detection circuit that generates the amplitude Up/Down signal 316 on receipt of the amplitude monitoring signal 316, which is the detection signal from the amplitude sensor 312 (see FIG. 12) comprises: an equalizer circuit 701 in respect of the detection signal from the amplitude sensor 312, a detection section that detects the output from the equalizer circuit 701, an LPF 703, a comparator 704 that outputs the result of comparing the output from the LPF 703 with a reference voltage, and a D-FF 705 that accepts and holds the output from the comparator 704 obtained in response to the amplitude sample timing signal 315 from the PLL/timing generating circuit 323 and outputs this as an amplitude Up/Down signal 316.

As described above, the equalizer circuit 701 is adjusted during manufacture such that its gain can obtain the rated mechanical amplitude and comprises a function of compensating the frequency characteristic of the amplitude sensor and a function of noise removal. If the amplitude sensor 312 is constituted by a sensor that detects acceleration, this equalizer circuit 701 is also provided with a function of double integration of the vicinity of 28 KHz, which is the drive frequency that is employed in this embodiment of the present invention, to produce a signal proportional to the amplitude.

The output signal from the equalizer circuit 701 is converted to a DC voltage indicating the magnitude of the amplitude detected through the detection circuit 702 and LPF 703 and this DC voltage is applied to the comparator 704. The comparator 704 compares the DC voltage indicating the magnitude of the amplitude that is output through the LPF 703 with a reference voltage and outputs to the D-FF 705 a binary signal indicating which of these is the larger. The LPF 703 needs to have a fairly rapid response speed, since it is necessary to considerably reduce the 28 KHz component and since a control loop of about one second becomes unstable if the response speed is too slow. Consequently, the LPF 703 is set to have a cut-off frequency of about 280 Hz.

Figure 17:
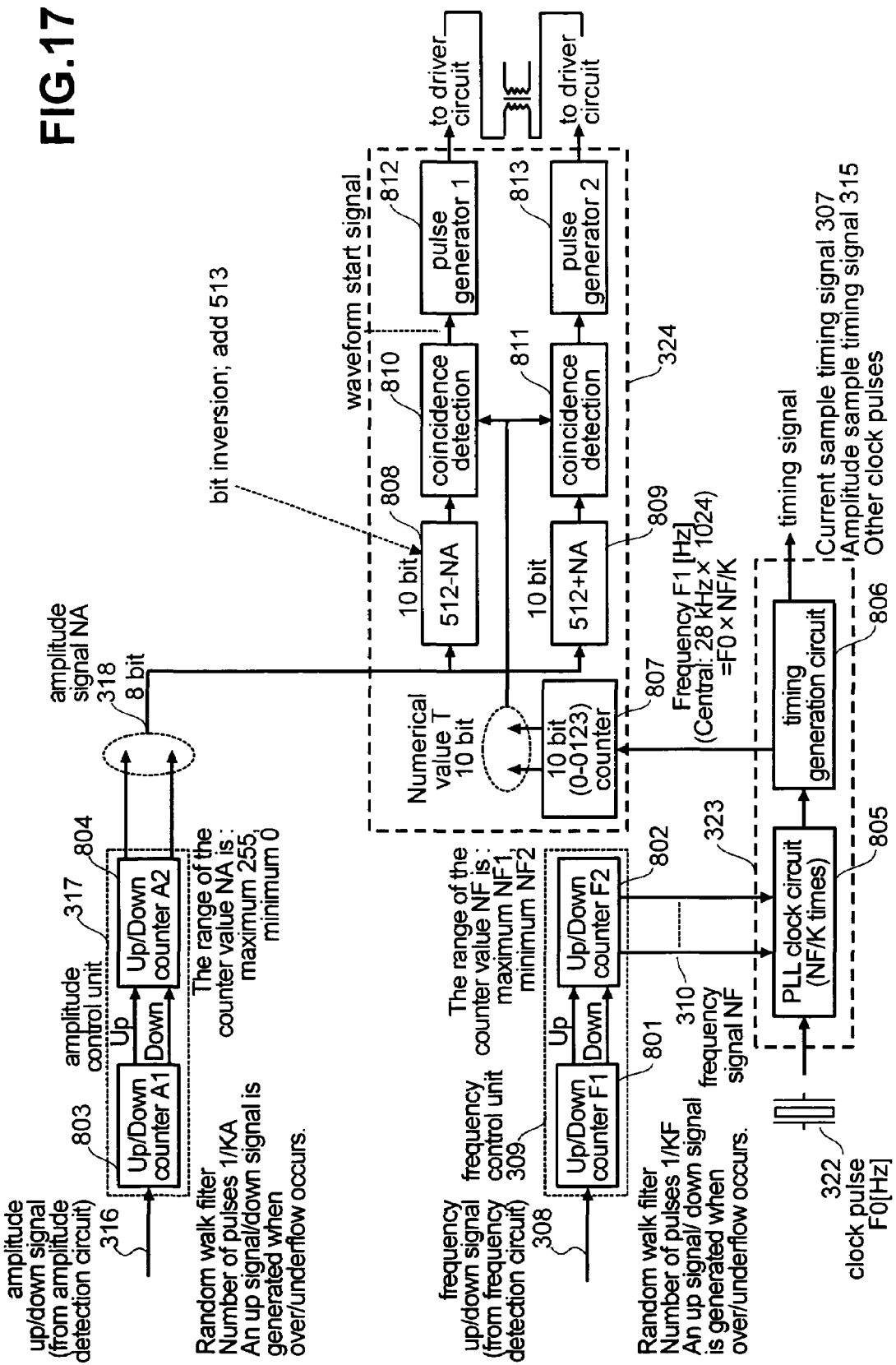
FIG. 17 is a block diagram showing the detailed layout of a frequency control unit, amplitude control unit, PLL/timing generating circuit and PWM signal generator.

FIG. 17 is a block diagram showing the detailed layout of the frequency control unit 309, amplitude control unit 317, the PLL/timing generating circuit 323 and the PWM signal generator 324. Next, the construction and processing operation of these control units and circuits will be described with reference to FIG. 17. In FIG. 17, 801 to 804 are Up/Down counters, 805 is a PLL clock circuit, 806 is a timing generating circuit, 807 is a 10-bit counter, 808 and 809 are 10-bit adders, 810 and 811 are coincidence detection circuits and 812, 813 are pulse generators; the other symbols have the same meaning as in the case of FIG. 12.

Next, the frequency control unit 309 and PLL/timing generating circuit 323 will be described. The frequency control unit 309 comprises two Up/Down counters 801, 802 and is controlled by the frequency Up/Down signal 308 from the frequency detection unit 328 (see FIG. 13). This Up/Down signal 308 is input with a frequency of 28 kHz. The frequency control range in the frequency control unit 309 is from F1 Hz to F2 Hz; this width should cover deviations of resonant frequency of the mechanical system but should also be sufficiently narrow that vibrations of other modes cannot arise in the mechanical system. Also, in order to prevent rush current being produced by the amplitude control, the control exercised by the frequency control unit 309 should be performed faster than the amplitude control. In this embodiment of the present invention, the ratio of these is arranged to be not equal to about 1, desirably at least about 10, so that there is no interference between the amplitude control and the frequency control, by making the amplitude control 1 second and frequency control 0.1 second.

Since the Up/Down counter (F2) 802 has a frequency resolution<28 kHz/(10·Q), the frequency resolution should preferably be no more than 100 Hz and is in fact designed such that a resolution of the order of 50 Hz is obtained. Also, the range of frequency variation is assumed to be ±1 kHz with respect to the central frequency of 28 KHz. As a result of the above, the maximum value NF1, minimum value NF2, and central value NF of the frequency signal 310 which constitutes the control signal in respect of the PLL/timing generating circuit 323 that is output by the Up/Down counter (F2) 802, are:

$NF1$=maximum frequency/resolution=29 kHz/50 Hz=580

$NF2$=minimum frequency/resolution=27 kHz/50 Hz=540

NF=28 kHz/50=560 (initial value on resetting), so 10 bits are required for the Up/Down counter (F2) 802.

Overflow of the counter sum of the Up/Down counter (F2) 802 is taken to indicate that convergence of the frequency has not been achieved and a warning is therefore sent to the warning generating unit 320.

The Up/Down counter (F1) 801 constitutes a random walk filter for excluding the effects of slight noise and determines whether the average value is 1 or 0; if it is clear that the frequency for example immediately after starting up of the device has drifted, the received Up/Down signals are counted and Up/Down control of the counter (F2) is only performed when overflow takes place.

The number of Up/Down signals 308 that are received during the frequency tracking period of 0.1 second is 28 kHz×0.1 second=2800. From the fact that 28 kHz×0.1 second/$KF$=$NF1$−$NF2$, the overflow count number KF of the counter F1 required to achieve a change of the numerical value of the counter F2 from the minimum to the maximum with this number of Up/Down signals is $KF$=28 kHz×0.1 second/($NF1$−$NF2$)=70.

The PLL/timing generating circuit 323 comprises a PLL clock circuit 805 and a timing generating circuit 806. The PLL clock circuit 805 outputs a clock pulse of frequency F0 from the clock pulse source 322 NF/K times, using the frequency signal NF from the Up/Down counter (F2) 802. F0 and K are determined by the design. The timing generating circuit 806 generates F1=28 kHz×1024=28.672 MHz and various phases, so a further doubling of frequency may be required, depending on the design, for realization thereof.

Next, the amplitude control unit 317 will be described. The amplitude control unit 317 comprises two Up/Down Counters 803, 804 and is controlled by means of an amplitude Up/Down signal 316 from the amplitude detection circuit 314. This Up/Down signal 316 is input with a frequency of 28 kHz. The range of the amplitude control numerical value NA in the amplitude control unit 317 is assumed to be 0 to 511 and, as already described, the amplitude control takes place at a slower rate than the frequency control, i.e., in 1 second.

The Up/Down counter (A1) 803 constitutes a random walk filter for excluding the effects of slight noise and determines whether the average value is 1 or 0; if the amplitude for example immediately after starting up of the device starts from 0, it counts the received Up/Down signals and Up/Down control of the counter (A2) is only performed when overflow takes place.

The number of Up/Down signals 308 that are received during the amplitude tracking period of 1 second is 28 kHz×1 second=28000. From the fact that 28 kHz×1 second/$KA$=511, the overflow count number KA of the counter A1 required to achieve a change of the numerical value of the counter A2 from the minimum to the maximum with this number of Up/Down signals is $KA$=28 kHz×1 second/511=55.

Overflow of the Up/Down counter (A2) 804 is taken to indicate that the amplitude is insufficient and a warning is therefore sent to the warning generating unit 320.

Next, the PWM signal generating circuit 324 will be described. As shown in FIG. 17, the PWM signal generating circuit 324 comprises a 10-bit counter 807, two 10-bit adders 808, 809, two coincidence detection circuits 810, 811 and two pulse generators 812, 813 and is arranged to be capable of generating a pair of PWM signals. The PWM signal generating circuit 324 employed in this embodiment of the present invention is constructed so as to be also capable of performing amplitude control. First of all, the method of PWM signal waveform and amplitude control used in the PWM signal generating circuit 324 is controlled.

Figure 18:
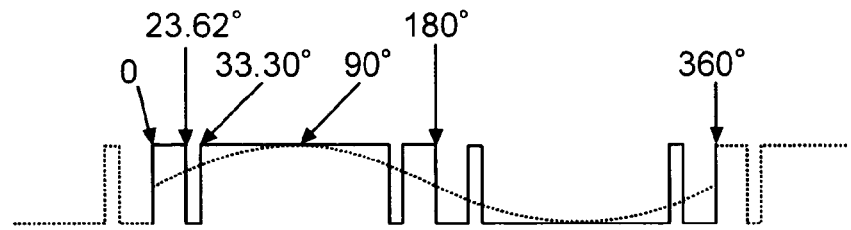
FIG. 18 is a view showing a PWM signal waveform employed in a PWM signal generating circuit according to an embodiment of the present invention.
Figure 19:
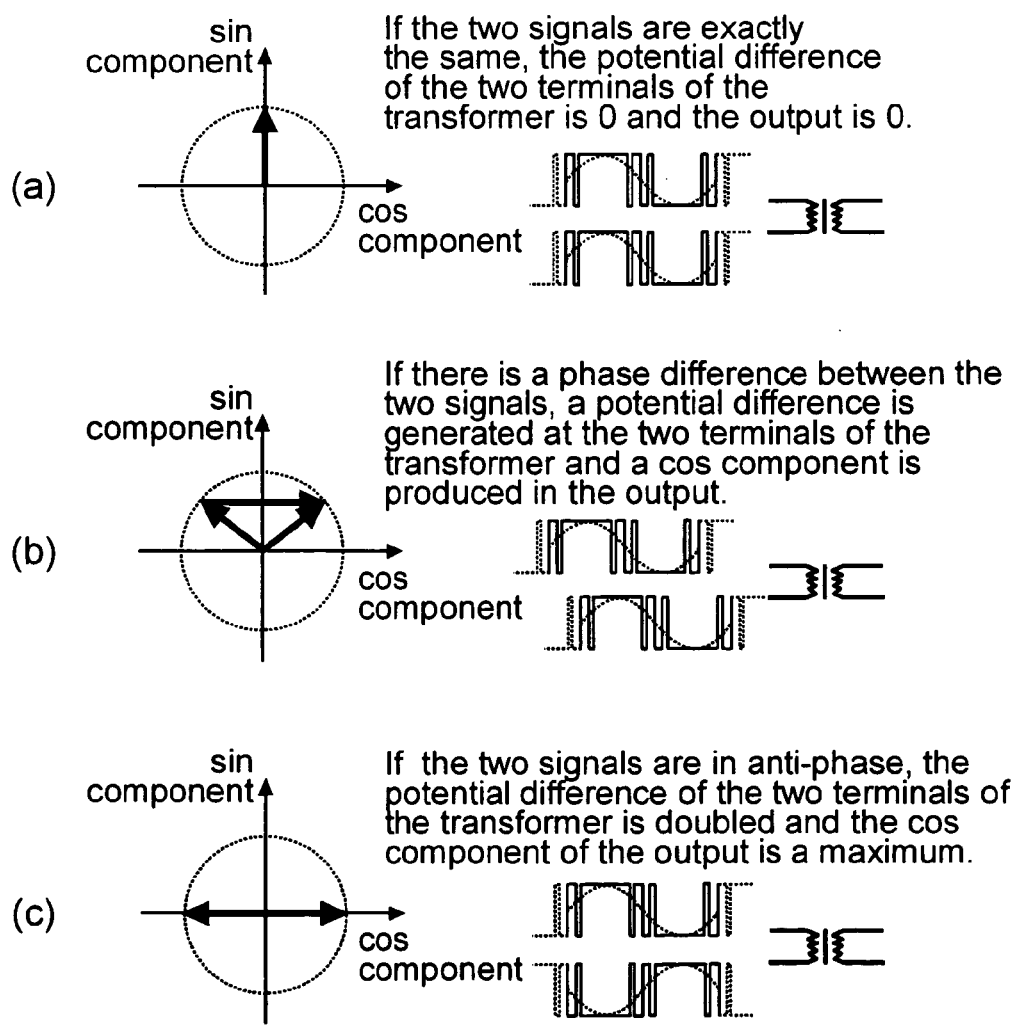
FIG. 19 is a view given in explanation of a method of amplitude control.

FIG. 18 is a view showing the PWM signal waveform employed by the PWM signal generating circuit 324 in this embodiment of the present invention and FIG. 19 is a view given in explanation of the method of amplitude control.

In this embodiment of the present invention, it is arranged for the output signal of the PWM signal generating circuit 324 to be amplified by the driver 325 using a D-class amplifier. In this process, in order to raise the power efficiency using the D-class amplifier, it is necessary to suppress multi-mode vibration of the mechanical system caused by harmonics. In this embodiment of the present invention, a PWM signal is therefore employed having a waveform as shown in FIG. 18. The waveform shown in FIG. 18 does not contain harmonics of the second order to sixth order and so can suppress multi-mode vibration of the mechanical system. In this embodiment of the present invention, the shape and magnitude of the waveform shown in FIG. 18 are output from the PWM signal generating circuit 324 without alteration.

In general, the amplitude can be adjusted by means of the power source voltage of the D-class amplifier. However, even if such a variable-voltage power source is not employed, the amplitude can be controlled by varying the phase of the waveform that is applied to both terminals of the drive transformer. This embodiment of the present invention is based on this concept. As described above a pair of PWM signals are generated in the PWM signal generating circuit 324. If the output phase is not important, it is possible to alter only the signal on one side of the drive transformer but, in this embodiment of the present invention, frequency control is performed by phase detection, so it is necessary to maintain the phase even though the amplitude is varied.

How the amplitude can be controlled by varying the phase of the waveform that is applied to both the terminals of the drive transformer will be described with reference to FIG. 19. If the two signals that are applied to the drive transformer are in phase, as shown in FIG. 19(*a*), the potential difference of the two terminals of the transformer is 0, so the output is 0. Also, if there is a phase difference in the two signals, as shown in FIG. 19(*b*), a potential difference is generated at the two terminals of the transformer, with the result that output in accordance with a cos component is obtained as the output. Furthermore, if the two signals are in anti-phase, as shown in FIG. 19(*c*), the potential difference of the two terminals of the transformer is doubled, and the cos component constituting the output becomes a maximum. In control of the amplitude as described above, if the phase of the two signals is varied symmetrically in both the plus and minus directions from an identical phase, it is possible to achieve control exclusively of the amplitude, without altering the output phase at all.

Figure 20:
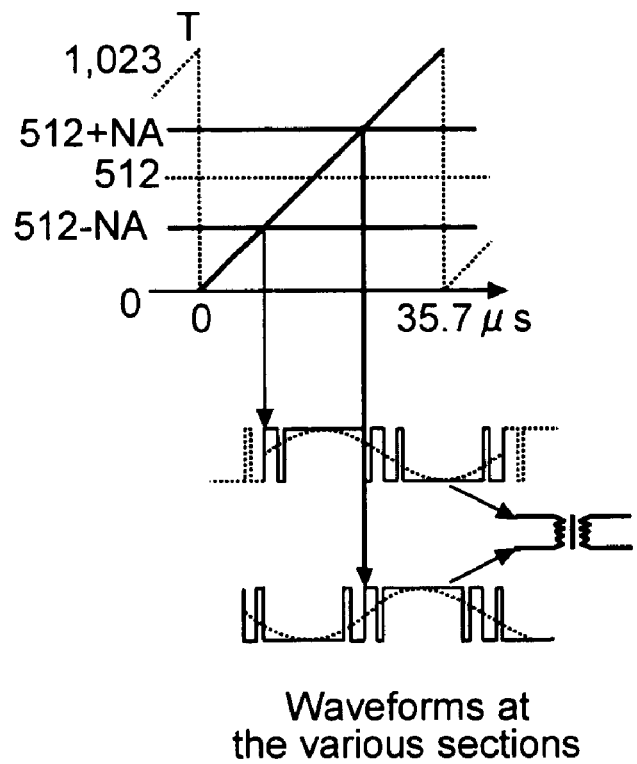
FIG. 20 is a view showing the numerical values that are output by a 10-bit counter of the PWM signal generating circuit and the waveform that is output by two pulse generators.
Figure 21:
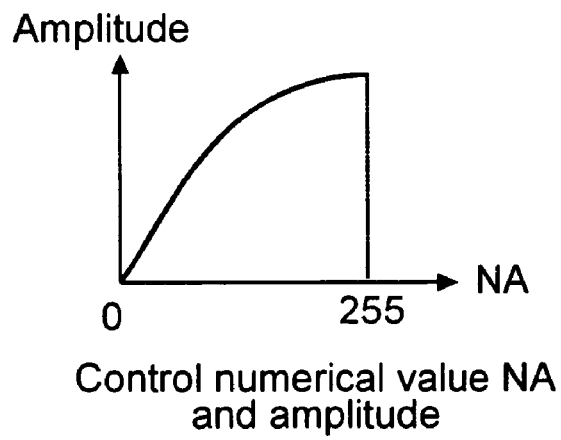
FIG. 21 is a view given in explanation of the relationship between the control numerical value NA and the amplitude.

FIG. 20 is a view showing the appearance of the numerical value that is output by the 10-bit counter 807 of the PWM signal generating circuit 324 and the waveform that is output by the two pulse generators 812, 813. FIG. 21 is a view given in explanation of the relationship between the control numerical value NA and the amplitude.

In the layout of the PWM signal generating circuit 324 described above (see FIG. 17), the numerical value T that is outputted by the 10-bit counter 807 has a sawtooth waveform, as shown in FIG. 20. Also, the adders 808, 809 receive the amplitude signal NA that controls the amplitude from the amplitude control unit 318 and respectively calculate 512−NA and 512+NA. The coincidence detection circuits 810, 811 instruct the pulse generators 812, 813 to generate a sine wave that is started matching the timing at which 512−NA and 512+NA coincide with the sawtooth waveform from the 10-bit counter 807. The pulse generators 812, 813 output a pair of PWM signals having mutually symmetrical phase changes corresponding to the amplitude that is to be outputted. In this way, the PWM signal generating circuit 324 can output a pair of PWM signals that are capable of controlling the amplitude of the signal that is outputted through the drive transformer without altering the output phase.

The relationship between the numerical value NA of the amplitude signal and the output amplitude is not linear but is a sine curve as shown in FIG. 21. From the point of view of automatic control, a linear characteristic in which the characteristic value does not vary would be preferable, but since this non-linearity in is in the direction of a more gentle response, it does not present a problem.

Figure 22:
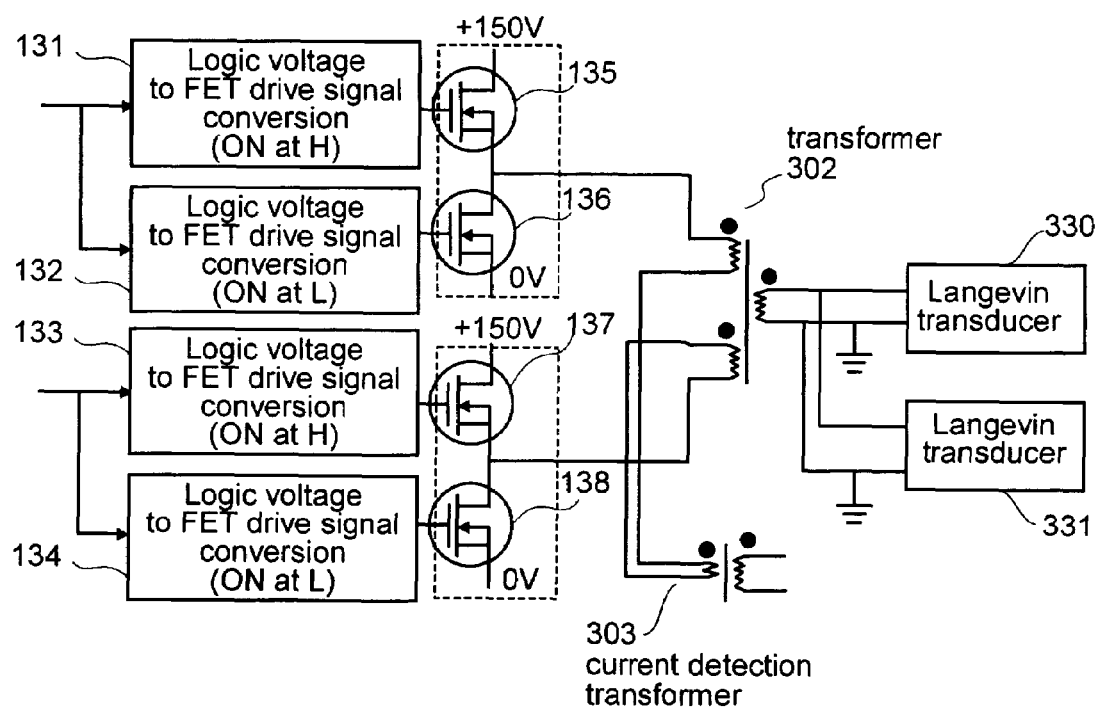
FIG. 22 is a block diagram showing the layout of a driver.

FIG. 22 is a block diagram showing the layout of the driver 325 (see FIG. 12). In FIG. 22, 131 to 134 are logic voltage-FET drive signal conversion circuits and 135 to 138 are output FETs. The other symbols have the same meaning as in the case of FIG. 12.

As shown in FIG. 22, the driver 325 comprising a D-class amplifier comprises four logic voltage-FET drive signal conversion circuits 131 to 134 and four output FETs 135 to 138 connected with these circuits. The logic voltage-FET drive signal conversion circuits 131, 132 are connected with one of the outputs of the PWM signal generating circuit 324 as described above and the logic voltage-FET drive signal conversion circuits 133, 134 are connected with the other output of the PWM signal generating circuit 324. Also, the logic voltage-FET drive signal conversion circuits 131, 133 perform signal conversion such that FETs 135 and 137 are turned ON by H level of the logic signal and the logic voltage-FET drive signal conversion circuits 132, 134 perform signal conversion such that FETs 136 and 138 are turned ON by L level of the logic signal. Furthermore, the FETs 135 and 136 are connected in series with voltages of 150 V, 0 V applied to both terminals thereof and FETs 137, 138 are connected in series with voltages of 150 V, 0 V applied to both terminals thereof.

The driver 325 constructed as described above may be designed in the same way as the existing reliable and successful drivers for sonar use. The differences between the driver employed in this embodiment of the present invention and a sonar driver are that the load is different, the frequency employed is different, it is necessary to consider, for example, removal of heat owing to the need for continuous operation, and it is necessary to consider the rise in temperature produced by the heat from the hot water.

Next, generation of a warning in this embodiment of the present invention will be described. Frequency abnormality and amplitude abnormality have already been described in the foregoing; generation of a warning in the case of abnormalities including such abnormalities will now be described.

In the Case of Loss of Power

The pilot lamp is not lit. If the device is not in use, no warning is generated. If a particular customer requires a warning to be generated when power is lost, this can be coped with by altering the design: for example, it can be coped with by employing a relay of the normally ON type.

In the Case of Current Leakage

The power source is disconnected by the action of the leakage current circuit breaker. A warning may be given by leakage current indication of the leakage current circuit breaker or may be indicated by extinction of the pilot lamp. A warning using an electrical signal is not generated. If a particular client requires generation of a warning by leakage current circuit breaker disconnection, this can be achieved by altering the design: in the same way as described above, it can be achieved by employing a relay of the normally ON type.

Frequency Abnormality

A warning is generated from a warning lamp and warning terminal in the event that the resonant point changes to outside the rated frequency range as a result of for example erosion, loosening, breakage of a piezoelectric element, or current leakage.

Amplitude Abnormality

A warning is generated from a warning lamp and warning terminal in the event of change to outside the rated amplitude range as a result of, for example, erosion, loosening, breakage of a piezoelectric element or current leakage.

Checking the Warning Action

When the power is switched on, a warning is generated at the warning lamp and warning terminal for one second only.

Warning Terminal Specification

Three relay contact terminals are to be installed; an ON warning assembly and OFF warning assembly are to be provided. The voltage and current capacity are to be AC 100 V, 1 A (i.e., capacity capable of lighting a light bulb).

Method of Maintenance and Operation in the Event of a Warning

The warning signal in this embodiment of the present invention is arranged to generate a warning tone or flashing light at the cabinet panel or maintenance worker's alarm device connected in parallel (in the case of an ON alarm) or connected in series (in the case of an OFF alarm) outside the device. The maintenance worker hastens to the location of the devices and can identify an abnormal device by viewing the warning lamps provided for each device. Also, since a large number of sterilizing cells are provided operating in parallel, there is no possibility of the overall sterilization rate becoming zero, even if a single sterilization cell is inoperative.

The maintenance worker from the manufacturers, for example, may bypass the flow of water by operating a valve, remove or replace the abnormal device and then return the valve to its original setting. Replacement after repair may be effected in the same way. The flow distributor and flow merger need to be provided with valves to prevent leakage of water when a sterilization cell is removed; in this way, operation of the system can be continued with the remaining sterilization cells even if some of the plurality of sterilization cells are removed for maintenance or other reasons.

In this embodiment of the present invention described above, the case has been described in which control is performed using a digital circuit such as an FPGA. However, in other embodiments of the present invention, the same processing could be performed using an inexpensive CPU or the same processing could be performed using analogue circuitry.

The present embodiment was described above taking as an example the case in which it was employed for sterilization of the water of a circulatory bath for hot spring water, for example. However, the present embodiment could also be employed for treatment of mains water, sewage treatment water or ballast water in tankers. In addition, it could be employed for automatic control and warning detection of frequency/amplitude of for example ultrasonic processing machines (ultrasonic processing equipment, ultrasonic scalpels for medical use, wire bonders or heaters for molten adhesive).

As described above, according to the embodiment of the present invention as shown in FIGS. 10–22, it is possible to automatically track the frequency of ultrasonic waves such that optimal cavitation is generated and to perform automatic control of amplitude; notification can be given of abnormality in cases where the change of resonant frequency produced by erosion of the device itself exceeds the operating range, or in cases where water is absent, for example, and warning can be given in cases where either of the frequency or amplitude departs from the tracking range.

Hot-Water Sterilization Device and Method

There are numerous reports concerning the sterilizing action of ultrasonic waves. The sterilizing action of ultrasonic waves may involve mechanical disintegration due to cavitation and chemical effects due to an oxidizing action or the like and must be optimally designed in accordance with the targeted microbes.

It is believed that an equivalent sterilizing action could be performed on alkaline hot water, which is difficult to disinfect with chlorine, without being affected by the pH of the hot water in question, by making use of the mechanical disintegration action.

It is also known that the cavitation produced by ultrasonic waves has a de-gassing action. When combined with chlorine disinfection, residual chlorine gas is removed by using this effect, making it possible to prevent a smell of chlorine being generated in the bath.

Figure 23:
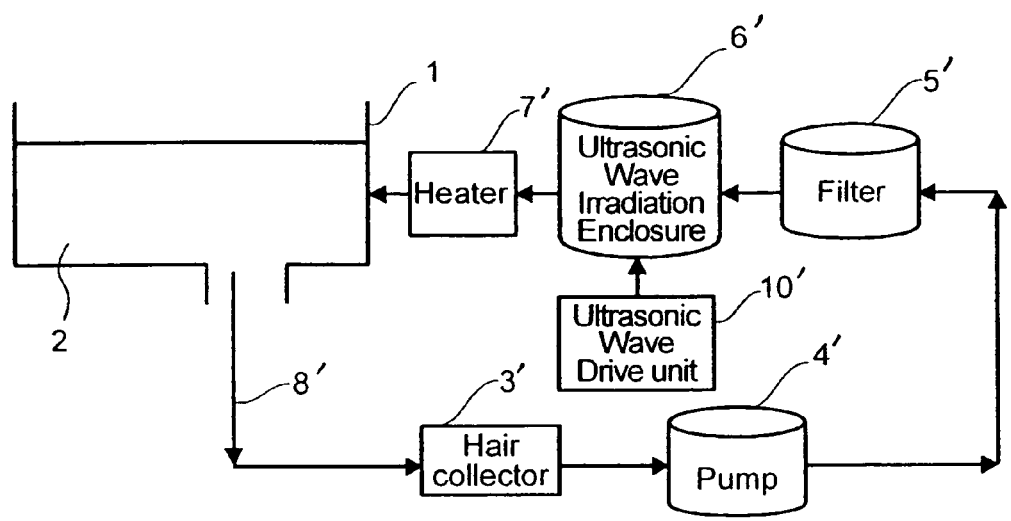
FIG. 23 is a block diagram of a hot-water sterilization device according to an embodiment of present invention.

Embodiments of the present invention for sterilizing alkaline hot water or the like are described below with reference to the drawings. FIG. 23 is a block diagram of an embodiment of a circulatory bath constituting one embodiment of the present invention. The circulating water 2 of a bath 1 passes through a conduit 8', passes through a hair collector 3' that collects and removes hair and the like, is pressurized by a pump 4', and enters a filter 5' that decomposes and removes organic waste by the action of microorganisms. The hot water is then subjected to sterilization processing by directing ultrasonic waves thereon in an ultrasonic wave irradiation enclosure 6' that is driven by the output of an ultrasonic wave drive unit 10'. The mechanism of ultrasonic wave sterilization may be any of the devices described in the present application or in any of the references cited herein or the like. When sterilization has been completed, the circulating water is heated by a heater 7' and returned to the bath 1 for use in bathing.

In this embodiment, the frequency of the ultrasonic waves is below 500 kHz, and more preferably below 20 kHz. The reason for this is that, according to "Ultrasonic Wave Technology Handbook (Choonpa Gijutsu Benran)(New Edition) (Nikkan Kogyo Shinbun Sha) p. 858, it is known that the oxidizing action of ultrasonic waves is particularly powerful at frequencies of 500 kHz and above. If ultrasonic waves of a frequency of less than 500 kHz are employed, the change of bath quality if the bath contains bathing agents or the effect on consumption of chlorine for disinfection is small. Furthermore, from the same reference, it is known that the oxidative effect of ultrasonic waves is extremely weak at frequencies below 20 kHz. It is therefore possible to create only mechanical disintegration (sterilization) of microbes if cavitation is produced by irradiation with ultrasonic waves of less than 20 kHz. It should be noted that, although, for simplicity in illustration in FIG. 23, only one set of ultrasonic wave irradiation tank 6' and ultrasonic wave drive unit 10' are shown, a plurality thereof could be arranged in parallel, depending on the flow rate and sterilization capability.

With this embodiment, sterilization of microbes in hot water can be achieved even without using chlorine. Also, since ultrasonic waves are employed as the method of sterilization, even if the hot water is colored to a chromaticity of 5 or more, sterilization can still be achieved. Also, sterilization can be achieved even if the water is cloudy with a turbidity of 1 or more.

Figure 24:
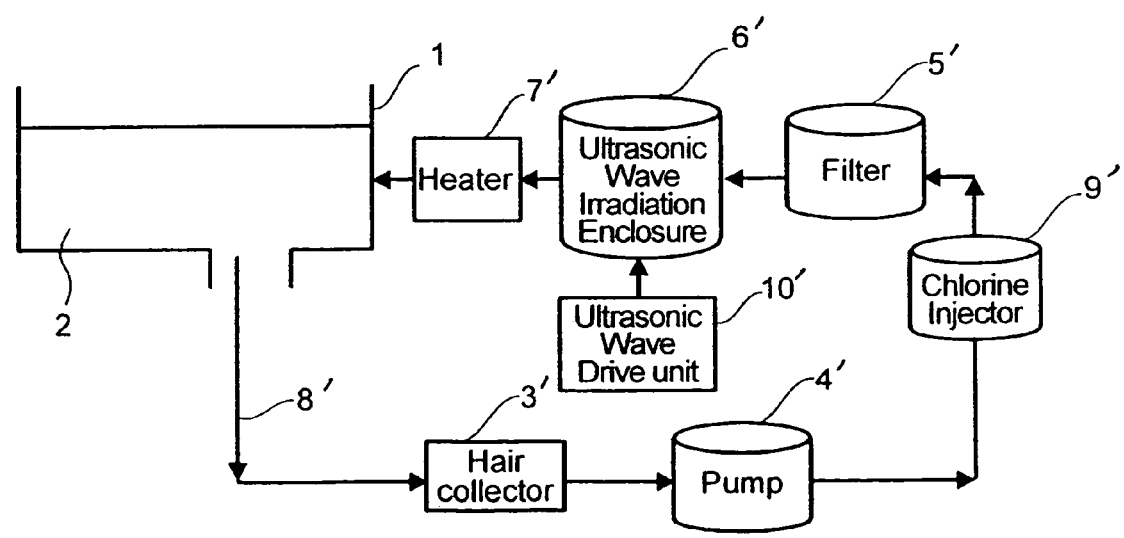
FIG. 24 is a block diagram of a hot-water sterilization device according to another embodiment of present invention.

Another embodiment will be described with reference to FIG. 24. FIG. 24 is a block diagram of another embodiment of a circulatory bath.

In the embodiment of FIG. 23, there is a possibility that bacteria (pathogenic bacteria) may colonize and multiply on the filter 5' where organic substances are decomposed by microorganisms. If the rate of division of the bacteria in question is expressed by the time T which is taken for the number of bacteria to double, the minimum sterilization capability that the ultrasonic wave irradiation enclosure 6' is required to have is the capability of reducing the number of pathogenic bacteria inhabiting the bath 1 by half in the time T. However, if bacteria proliferate on the filter 5', there is a possibility that the capability of the ultrasonic wave irradiation enclosure 6' will be exceeded. Accordingly, a chlorine injector 9' is arranged between the pressurization pump 4' and filter 5' in the embodiment of FIG. 24. The chlorine injector 9' is a device for injecting chlorine with the object of sterilizing the interior of the filter. Since users of the bath do not like chlorine, residual chlorine after sterilization is removed by de-gassing in the ultrasonic wave irradiation enclosure 6'. In this embodiment, the ultrasonic wave frequency is preferably 20 to 500 kHz.

In this embodiment, the amount of heat generated in the ultrasonic wave irradiation enclosure is arranged to be absorbed by the bath water which is the subject of treatment or the hot water passing through the ultrasonic wave irradiation enclosure, rather than the external atmosphere; in this way, efficient utilization of energy can be achieved.

In this embodiment, if the water pressure in the interior of the ultrasonic wave irradiation enclosure is high, generation of ultrasonic cavitation is suppressed. It is therefore effective in improving the performance of the device to lower the pressure of the ultrasonic wave irradiation enclosure 6' by arranging the ultrasonic wave irradiation enclosure 6' in a position higher than that of the bath 1. Specifically, if the ultrasonic wave irradiation enclosure 6' is positioned at a position at a height of 5 m at the liquid surface, the water pressure is lowered by 0.5 atmosphere. The negative pressure required to generate cavitation of a high sterilization capability is substantially 10 atmospheres, so intense cavitation can be generated with an ultrasonic wave gas pressure of 9.5 atmospheres at a position at the height of 5 m. The ultrasonic wave acoustic pressure is proportional to the input voltage, so the required voltage is reduced by 5%, with the benefit that, in energy terms, an energy saving of 10% can be achieved.

In addition, the water pressure of the conduit is lowered at a position where the flow rate is increased, so that such a location constitutes a position that is effective for the arrangement of the ultrasonic wave irradiation enclosure. Furthermore, the pressure of the ultrasonic wave irradiation enclosure 6' can also be lowered by providing an aspirator in part of the piping system (e.g., downstream of the pressurizing pump 4'). With the present invention, effective sterilization can be achieved with no smell of chlorine and that is unaffected by factors such as the pH level or degree of turbidity of the hot water.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A water treatment method of sterilizing water containing microbes, the method comprising:

supplying ultrasonic vibration to the water to be treated by driving and controlling a transducer of a sterilization cell using a signal;

detecting an amplitude of the transducer and a frequency of the signal applied to the transducer; and controlling the amplitude and a vibration frequency of the transducer to target values in accordance with the detected transducer amplitude and the detected signal frequency.

2. The water treatment method according to claim 1 wherein the target vibration frequency of the transducer is a resonant frequency of a vibration system.

3. The water treatment method according to claim 1 wherein detecting the frequency of the signal that is applied to the transducer comprises detecting a phase of a current with respect to a voltage of the signal that is applied to the transducer.

4. The water treatment method according to claim 1 wherein controlling the amplitude of the transducer comprises controlling the amplitude without changing a phase of the vibration, by applying a pair of PWM signals having mutually symmetrical phase changes in accordance with a magnitude of the amplitude to the transducer through a drive transformer.

5. The water treatment method according to claim 1, wherein the amplitude and the vibration frequency of the transducer are controlled with a ratio of convergence times of the amplitude control and frequency control being set to be not equal to about 1 to prevent mutual interference between amplitude control and frequency control to the respective target values.

6. The water treatment method according to claim 1 further comprising generating a warning when an abnormal magnitude is detected in the amplitude or the signal frequency of the transducer, the abnormal magnitude being outside a preset range of amplitude or a preset range of signal frequency of the transducer.

* * * * *